(12) United States Patent
Lee

(10) Patent No.: US 10,152,272 B2
(45) Date of Patent: ***Dec. 11, 2018

(54) DATA MIRRORING CONTROL APPARATUS AND METHOD

(71) Applicant: Samsung Electronics Co., Ltd., Suwon-si, Gyeonggi-do (KR)

(72) Inventor: Ju-Pyung Lee, Incheon (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,866

(22) Filed: Apr. 13, 2018

(65) Prior Publication Data

US 2018/0232150 A1 Aug. 16, 2018

Related U.S. Application Data

(63) Continuation of application No. 14/451,834, filed on Aug. 5, 2014, now Pat. No. 9,983,824.

(30) Foreign Application Priority Data

Sep. 27, 2013 (KR) ........................ 10-2013-0115579

(51) Int. Cl.
*G06F 3/0484* (2013.01)
*G06F 3/06* (2006.01)
*G06F 11/20* (2006.01)

(52) U.S. Cl.
CPC ............ *G06F 3/065* (2013.01); *G06F 3/0604* (2013.01); *G06F 3/0659* (2013.01);
(Continued)

(58) Field of Classification Search
CPC .. G06F 11/1469; G06F 3/0619; G06F 3/0689; G06F 11/1451; G06F 2201/84;
(Continued)

(56) References Cited

U.S. PATENT DOCUMENTS 6,098,128 A 8/2000 Velez-Mccaskey et al.
6,272,571 B1 8/2001 Bachmat
(Continued)

FOREIGN PATENT DOCUMENTS

CN 1708742 A 12/2005
JP 2010061591 A 3/2010
(Continued)

OTHER PUBLICATIONS

European Search Report dated May 27, 2015, for European patent application No. 14186369.6.
(Continued)

*Primary Examiner* — David X Yi
*Assistant Examiner* — Candice Rankin
(74) *Attorney, Agent, or Firm* — Harness, Dickey & Pierce, P.L.C.

(57) ABSTRACT

A data mirroring control apparatus includes a command distributing unit configured to transmit a first write command to a plurality of mirroring storage devices, the first write command including an instruction for data requested by a host to be written; and a memory lock setting unit configured to set a memory lock on the data requested by the host to be written among data stored in a host memory and configured to release the memory lock on the data after the data with the memory lock is written to the plurality of mirroring storage devices.

13 Claims, 24 Drawing Sheets

(52) U.S. Cl.
CPC ........ *G06F 3/0689* (2013.01); *G06F 11/2087* (2013.01); *G06F 2201/825* (2013.01)

(58) Field of Classification Search
CPC ....... G06F 17/30575; G06F 2213/3802; G06F 11/1008; G06F 11/2056; G06F 11/2094; G06F 12/0868; G06F 3/065; G06F 11/2089; G06F 12/0815; G06F 2212/621; G06F 3/0679; G06F 12/0246; G06F 2212/202; G06F 3/0688; G06F 11/2069; G06F 11/2074; G06F 17/30578; G06F 3/0647; G06F 3/067; G06F 11/1666; G06F 17/30171; G06F 21/552; G06F 17/30362; G06F 12/0871
See application file for complete search history.

(56) References Cited

U.S. PATENT DOCUMENTS

| | | | |
|---|---|---|---|
| 6,324,654 | B1 | 11/2001 | Wahl et al. |
| 6,467,034 | B1 | 10/2002 | Yanaka |
| 7,013,379 | B1 | 3/2006 | Testardi |
| 7,433,948 | B2 | 10/2008 | Edsall et al. |
| 8,725,854 | B2 | 5/2014 | Edsall et al. |
| 2002/0152339 | A1 | 10/2002 | Yamamoto |
| 2003/0079083 | A1 | 4/2003 | Lubbers et al. |
| 2003/0172149 | A1 | 9/2003 | Edsall et al. |
| 2004/0117562 | A1 | 6/2004 | Wu et al. |
| 2005/0149683 | A1 | 7/2005 | Chong et al. |
| 2008/0320134 | A1 | 12/2008 | Edsall et al. |
| 2009/0216946 | A1 | 8/2009 | Sun |
| 2011/0066808 | A1 | 3/2011 | Flynn et al. |
| 2011/0126045 | A1 | 5/2011 | Bennett |
| 2012/0017043 | A1 | 1/2012 | Aizman et al. |
| 2014/0013032 | A1 | 1/2014 | Min et al. |

FOREIGN PATENT DOCUMENTS

| | | |
|---|---|---|
| JP | 2012252638 A | 12/2012 |
| KR | 20100115090 A | 10/2010 |
| WO | WO-03062979 A2 | 7/2003 |

OTHER PUBLICATIONS

Extended European Search Report dated Aug. 24, 2015, for European Patent Application No. 14186369.6.
Chinese Office Action for corresponding Chinese Application No. 201410509938.6 dated May 9, 2018.

DATA MIRRORING CONTROL APPARATUS AND METHOD

This application is a continuation of U.S. application Ser. No. 14/451,834 filed on Aug. 5, 2014, which claims priority under 35 U.S.C. § 119 to Korean Patent Application No. 10-2013-0115579 filed on Sep. 27, 2013 in the Korean Intellectual Property Office, the disclosures of each of which are incorporated herein by reference in their entirety.

BACKGROUND

1. Field

At least one example embodiment of the inventive concepts relates to data mirroring technology.

2. Description of the Related Art

For several decades, hard disk drives (HDDs) have been used as representative storage devices. An example of an HDD is a mechanical device that performs a read/write operation using the head of a disk that rotates at certain speed. The HDD may be relatively inexpensive in view of its capacity. However, since the read/write performance of the HDD is dependent on the rotating speed of the disk, the read/write performance, in particular, the random read/write performance of the HDD may be more limited than that of a semiconductor-based storage device. In addition, the HDD may have a higher breakdown rate than the semiconductor-based storage device. A breakdown in a storage device is detrimental because it can cause the loss of user data.

To overcome the limited performance and reliability of the HDD, redundant array of independent disks (RAID) technology has been widely utilized. The RAID technology forms an HDD array by connecting a number of HDD devices and appropriately distributes read/write operations among the HDD array. The RAID technology is classified into a number of detailed technologies—e.g., RAID 0 (striping), RAID 1 (mirroring), RAID 5 (striping with distributed parity), RAID 10 (mirroring and striping), etc.—according to the data arrangement policy between HDD devices. In particular, the mirroring technology may include storing the same data in two or more HDDs. Therefore, even if one of the HDDs breaks down, data loss can be prevented because an HDD which has not broken down can continuously provide data service.

Meanwhile, the utilization of solid state drives (SSDs) is continuously increasing. An SSD is compatible with an HDD and may have better performance and reliability than the HDD. Unlike the HDD, the SSD may have no mechanical device therein. Therefore, the SSD may have a lower breakdown rate than the HDD. Furthermore, the read/write performance, in particular, the random read/write performance of the SSD may be higher than that of the HDD. Although the SSD may be superior to the HDD in terms of performance and reliability, the RAID technology can also be applied to the SSD by forming an SSD array in order to achieve additional performance improvement or prevent data loss due to the breakdown of the SSD.

SUMMARY

At least one example embodiment of the inventive concepts provides a data mirroring control apparatus and method.

At least one example embodiment of the inventive concepts provides a data mirroring control apparatus including a command distributing unit which transmits a write command for data requested by a host to be written to a plurality of mirroring storage devices; and a memory lock setting unit which sets a memory lock on the data requested by the host to be written among data stored in a host memory and releases the memory lock on the data after the data with the memory lock is written to the plurality of mirroring storage devices.

At least one example embodiment of the inventive concepts provides a data mirroring control apparatus including a fast storage device setting unit which sets at least one of a plurality of mirroring storage devices as a fast storage device; a command distributing unit which transmits a write command for data requested by a host to be written to the fast storage device; and a memory lock setting unit which sets a memory lock on the data requested by the host to be written among data stored in a host memory and releases the memory lock on the data after the data with the memory lock is written to the plurality of mirroring storage devices.

At least one example embodiment of the inventive provides a data mirroring control method including transmitting a write command for data requested by a host to be written to a plurality of mirroring storage devices; setting a memory lock on the data requested by the host to be written among data stored in a host memory; and releasing the memory lock on the data after the data with the memory lock is written to the plurality of mirroring storage devices.

At least one example embodiment of the inventive concepts provides a data mirroring control method including setting at least one of a plurality of mirroring storage devices as a fast storage device; transmitting a write command for data requested by a host to be written to the fast storage device; setting a memory lock on the data requested by the host to be written among data stored in a host memory; and releasing the memory lock on the data after the data with the memory lock is written to the plurality of mirroring storage devices.

At least one example embodiment of the inventive concepts provides a data mirroring control apparatus including a command distributing unit which transmits a write command for data requested by a host to be written to a plurality of mirroring storage devices and transmits a write complete message for the requested data after the requested data is written to one of the plurality of mirroring storage devices; and a trim command transmitting unit which transmits a trim command to a storage device which has not received the write command for the requested data based on information about the writing of the requested data to one of the plurality of mirroring storage devices.

At least one example embodiment of the inventive concepts provides a data mirroring control apparatus including a command distributing unit configured to transmit a first write command to a plurality of mirroring storage devices in response to a write request from a host, the first write command instructing the plurality of mirroring storage devices to store requested data, the requested data being first data stored at a host, the write request indicating a request that the first data be written to at least one of the plurality of mirroring storage devices; and a memory lock setting unit configured to set a memory lock on the first data at the host in response to the write request, and configured to release the memory lock on the first data at the host in response to the first data being written to the plurality of mirroring storage devices.

The command distributing unit may be configured to transmit a second write command to a first one of the plurality of mirroring storage devices after receiving a write completion message indicating that the first mirroring storage device completed writing the first data, the first mirroring storage device being the storage device, from among the plurality of mirroring storage devices, that completes the writing of the first data at an earliest point in time relative to the remaining ones of the plurality of mirroring storage devices.

The memory lock setting unit may be configured to release the memory lock on the first data at the host in response to determining that every device, from among the plurality of mirroring storage devices, that received the first write command and is not disabled has completed writing the first data.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
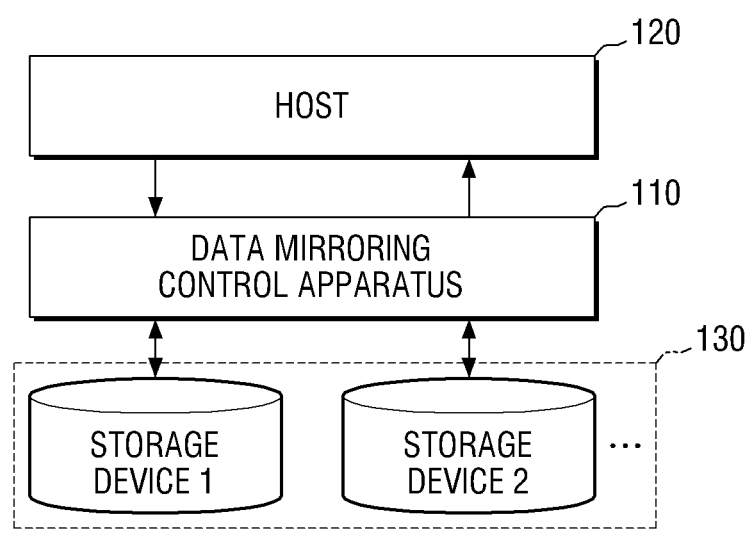
FIG. 1 is a diagram illustrating the configuration of a data mirroring storage system According to at least one example embodiment of the inventive concepts at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments of the inventive concepts.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. Hereinafter, at least some example embodiments of the inventive concepts will be described in detail with reference to the attached drawings.

FIG. 1 is a diagram illustrating the configuration of a data mirroring storage system According to at least one example embodiment of the inventive concepts of at least one example embodiment of the inventive concepts. Referring to FIG. 1, the data mirroring storage system may include a data mirroring control apparatus 110, a host 120, and a plurality of storage devices 130.

The plurality of storage devices 130 redundantly store the same data through data mirroring in order to prevent data loss when one of the storage devices 130 breaks down. According to at least one example embodiment of the inventive concepts, the storage devices 130 may include an array of solid state drives (SSDs). However, example embodiments of the inventive concepts are not limited thereto, and the storage devices 130 may also include one or more SSDs and one or more hard disk drives (HDDs).

The host 120 may transmit a write request for data stored in a host memory to the data mirroring control apparatus 110. Here, the host 120 may transmit the write request to the data mirroring control apparatus 110 in a blocking manner or a non-blocking manner. Specifically, with the non-blocking manner, the host 120 may transmit a write request for data to the data mirroring control apparatus 110 regardless of whether a write complete message for data the host 120 previously requested to be written has been received. On the other hand, with the blocking manner, the host 120 does not make a write request for data until a write complete message for data the host 120 previously requested to be written is received.

The data mirroring control apparatus 110 may set a memory lock on data requested by the host 120 to be written among data stored in the host memory.

In addition, the data mirroring control apparatus 110 may release the memory lock on the data after the data with the memory lock is written to all of the mirroring storage devices 130.

The memory lock may prevent data requested by the host 120 to be written, among data stored at a specific address of the host memory, from being erased from the host memory or being modified before the data is written to the storage devices 130.

According to at least one example embodiment of the inventive concepts, the data mirroring control apparatus 110 may transmit a write command for data requested by the host 120 to be written to the storage devices 130.

Here, the write command may be transmitted to each of the storage devices 130 in a blocking manner or a non-blocking manner. Specifically, with the blocking manner, the data mirroring control apparatus 110 may not transmit a write command for data when other data is currently being written to the storage devices 130. The data mirroring control apparatus 110 may transmit a write command for data once the other data is written to the storage devices 130.

On the other hand, with the non-blocking manner, the data mirroring control apparatus 110 may transmit a write command for another data to each of the storage devices 130 regardless of whether other data is being written to the storage devices 130. Each of the storage devices 130 stores a received write command in a command queue, completes writing the current data, and then writes other data by executing the write command stored in the command queue.

After data requested by the host 120 to be written is written to one of the storage devices 130, the data mirroring control apparatus 110 may transmit a write complete message for the data to the host 120.

According to at least one example embodiment of the inventive concepts, the data mirroring control apparatus 110 may transmit a write command for data requested by the host 120 to be written to a storage device set as a fast storage device among the storage devices 130. Specifically, the data mirroring control apparatus 110 may transmit a write command to each of the storage devices 130. Then, when one of the storage devices 130 completes executing the write command, the data mirroring control apparatus 110 may transmit a write complete message to the host 120.

According to at least one other example embodiment of the inventive concepts, the data mirroring control apparatus 110 may transmit a write command to a fast storage device among the storage devices 130 and transmit a write complete message to the host 120 when the fast storage device completes executing the write command.

The data mirroring control apparatus 110 may be implemented as a separate apparatus from the host 120. However, example embodiments of the inventive concepts are not limited thereto, and the data mirroring control apparatus 110 may also be included in the host 120.

Figure 2:
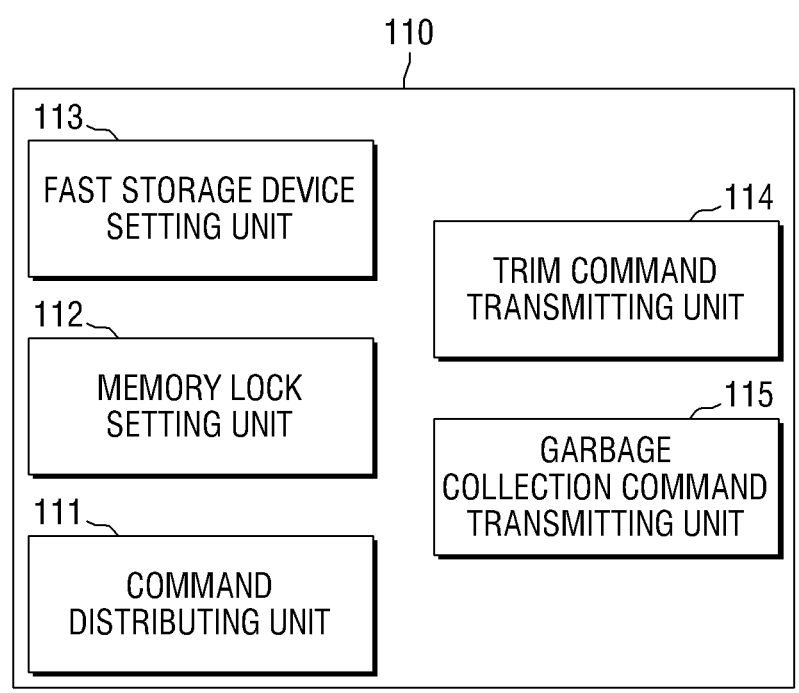
FIG. 2 is a diagram illustrating the configuration of a data mirroring control apparatus According to at least one example embodiment of the inventive concepts at least one example embodiment of the inventive concepts.

FIG. 2 is a diagram illustrating the configuration of a data mirroring control apparatus 110 according to at least one example embodiment of the inventive concepts.

Referring to FIG. 2, a memory lock setting unit 112 may set a memory lock on data requested by the host 120 to be written among data stored in the host memory.

In addition, the memory lock setting unit 112 may release the memory lock on the data after the data with the memory lock is written to all of the storage devices 130.

In other words, the memory lock on the data requested by the host 120 to be written may be released after the data is written to all of the storage devices 130, not just to any one of the storage devices 130.

According to at least one example embodiment of the inventive concepts, when receiving a write request for data from the host 120, a command distributing unit 111 may transmit a write command for the requested data to each of the storage devices 130.

When one of the storage devices 130 completes executing the write command, the command distributing unit 111 may transmit a write complete message to the host 120.

According to at least one example embodiment of the inventive concepts, the command distributing unit 111 may transmit a write command for data requested by the host 120 to be written to a storage device set as a fast storage device among the storage devices 130.

In this case, after the requested data is written to the fast storage device, the command distributing unit 111 may transmit a write complete message for the data to the host 120.

A fast storage device setting unit 113 may set at least one of the storage devices 130 as a fast storage device. Here, the fast storage device may be a storage device which stores the latest data among the storage devices 130.

According to at least one example embodiment of the inventive concepts, the fast storage device setting unit 113 may set a storage device, among the storage devices 130, as the fast storage device based on the write completion speed in response the write command.

Specifically, the fast storage device setting unit 113 may set a storage device which writes the same data at highest speed as the fast storage device among the storage devices 130.

In addition, if a storage device that completes writing the same data first is not the fast storage device, the fast storage device setting unit 113 may change the storage device to the fast storage device.

According to at least one example embodiment of the inventive concepts, the fast storage device setting unit 113 may set an arbitrary storage device as the fast storage device among the storage devices 130 and change the fast storage device periodically or non-periodically.

For example, the fast storage device setting unit 113 may periodically receive a write acceleration factor (WAF) value from each of the storage devices 130 and set a storage device having a highest WAF value as the fast storage device. According to at least some example embodiments of the inventive concepts, the WAF of a storage device may be, or indicate, a write speed of the storage device.

As another example, when the fast storage device has a write delay, the fast storage device setting unit 113 may change the fast storage device.

As another example, when a free block is reduced to a predetermined or, alternatively, reference size or less due to the execution of a write command by the fast storage device, the fast storage device setting unit 113 may change the fast storage device.

According to at least one example embodiment of the inventive concepts, the fast storage device may be set using a fast storage device indicator stored in each of the storage devices 130. Specifically, the fast storage device setting unit 113 may set or change the fast storage device by setting a value of the fast storage device indicator stored in each of the storage devices 130 to one or zero.

According to at least one example embodiment of the inventive concepts, when the fast storage device breaks down, the command distributing unit 111 may transmit a write command for data with a memory lock to another storage device which has not broken down.

The memory lock set on the data indicates that the data has not yet been written to at least one of the storage devices 130. Therefore, when the fast storage device breaks down, if the data with the memory lock is transmitted to another storage device which has not broken down, the loss of the data due to the breakdown of the fast storage device may be prevented.

According to at least one example embodiment of the inventive concepts, when the host 120 has a failure, the command distributing unit 111 may perform matching data stored in the storage devices 130.

Specifically, when the host 120 is rebooted due to an unexpected failure, the command distributing unit 111 may compare data stored in the fast storage device with data stored in the other storage devices 130 to determine whether the data stored in the fast storage device matches the data stored in the other storage devices 130.

When the data stored in the fast storage device does not match the data stored in the other storage devices 130, the command distributing unit 111 may send an overwrite command to the other storage devices 130 based on the data stored in the fast storage device in order to match the data stored in the storage devices 130.

A trim command transmitting unit 114 may transmit a trim command to a storage device which has not yet received a write command for data based on information about the writing of the data to one of the storage devices 130.

Specifically, it may be difficult or impossible to in-place update a NAND flash which is a component of an SSD. Therefore, to perform a write operation at a specific location, the entire block including the location should be erased in advance. Here, invalid data that is no longer used is erased, and valid data is transferred to another block.

Therefore, when one of the storage devices 130 completes writing data, the trim command transmitting unit 114 informs a storage device, which has not received a write command for the data, of an invalid data area by using a trim command, thereby improving the performance of the storage device and reducing the wear and tear of the storage device.

When a storage device set as the fast storage device is changed to a slow storage device, a garbage collection command transmitting unit 115 may transmit a garbage collection command to the storage device changed to the slow storage device.

Specifically, in a case where a write command for data requested by the host 120 to be written is transmitted only to a fast storage device, the write command is not transmitted to a storage device that has been changed to a slow storage device. In this case, the storage device changed to the slow storage device is made to perform garbage collection so as to secure spare space in advance. Accordingly, this improves the write performance of the storage device when the storage device is set as the fast storage device again.

The slow storage device may be a storage device that is not set as the fast storage device.

Figure 3A:
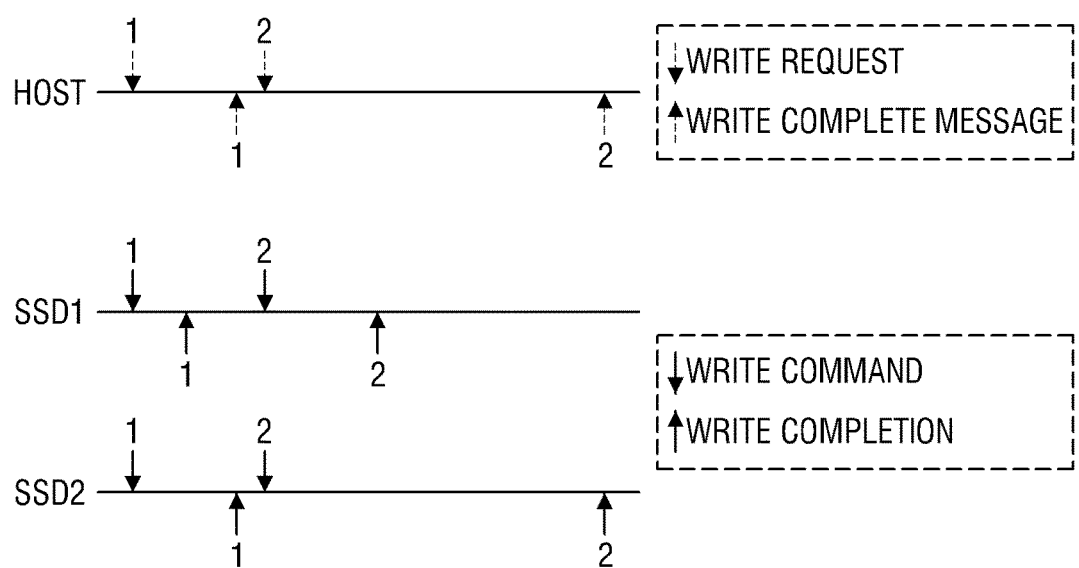
FIGS. 3A through 3C are diagrams illustrating data loss in a case where a memory lock is not applied.
Figure 3B:
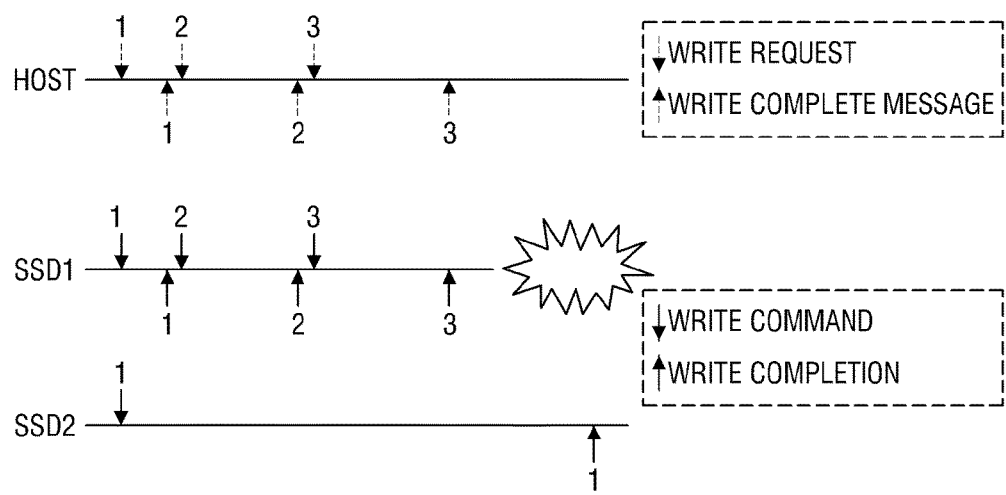

FIGS. 3A through 3B are diagrams illustrating data loss in a case where a memory lock is not applied.

FIG. 3A illustrates an example of a case where a write complete message is transmitted to a host after data requested by the host to be written is written to all mirroring storage devices. In the example of FIG. 3A, a write complete message is transmitted to the host at a time when SSD 1 and SSD 2 complete writing data requested by the host to be written.

Specifically, a write complete message for data 1 is transmitted to the host when SSD 2 with slow writing completion speed completes writing data 1. Likewise, a write complete message for data 2 is transmitted to the host when SSD 2 with slow writing completion speed completes writing data 2.

The host may transmit a data write request to SSD 1 and SSD 2 in a blocking manner. Specifically, the host may transmit a write request for data to SSD 1 and SSD 2 only after receiving a write complete message for data that the host previously requested to be written.

In the example of FIG. 3A, after SSD 2 completes writing data 1, the host transmits a write request for data 2 to SSD 1 and SSD 2. In the example illustrated in FIG. 3, even if SSD 1 breaks down after completing the writing of data 1, since a write complete message for data 1 is not transmitted to the host until SSD 2 completes writing data 1, data 1 in a host memory is not erased or modified. Therefore, a write command for data 2 can be transmitted to SSD 2, thereby preventing the loss of data 2.

However, even if SSD 1 completes writing data early, a write request for next data is not transmitted until SSD 2 completes writing the data. Therefore, the writing completion speed of the entire storage devices is reduced.

FIG. 3B illustrates an example of a case where a write complete message is transmitted to the host immediately after one of a plurality of mirroring storage devices completes writing data.

Unlike in the case of FIG. 3A, in the case of FIG. 3B, a write complete message is transmitted to the host immediately after either one of SSD 1 and SSD 2 completes writing data. In addition, when receiving the write complete message, the host transmits a write request for another data (thus operating in a blocking manner).

Specifically, since the writing completion speed of SSD 1 is faster than that of SSD 2 for data 1, 2 and 3 requested by the host to be written, a write complete message for each of data 1, data 2 and data 3 is transmitted to the host at a time when SSD 1 completes writing each of data 1, data 2 and data 3.

When receiving a write complete message for data 1, the host makes a write request for data 2, and a write command for data 2 is transmitted to SSD 1. In addition, when receiving a write complete message for data 2, the host makes a write request for data 3, and a write command for data 3 is transmitted to SSD 1.

In this case, the writing completion speed of the entire storage devices is increased compared with the case of FIG. 3A. However, if SSD 1 breaks down before the write command for each of data 2 and data 3 is transmitted to the SSD 2, data 2 and data 3 may be lost.

Specifically, if the host has already received the write complete message for each of data 1, data 2 and data 3, data 2 and data 3 stored in the host memory may be erased or modified. Therefore, when SSD 1 breaks down after completing writing data 3 as in the example of FIG. 3B, if data 2 and data 3 are not maintained in the host memory, the write commands for data 2 and data 3 cannot be transmitted to SSD 2 which has not yet received the write commands for data 2 and data 3. In this case, data 2 and data 3 may be lost.

Figure 3C:
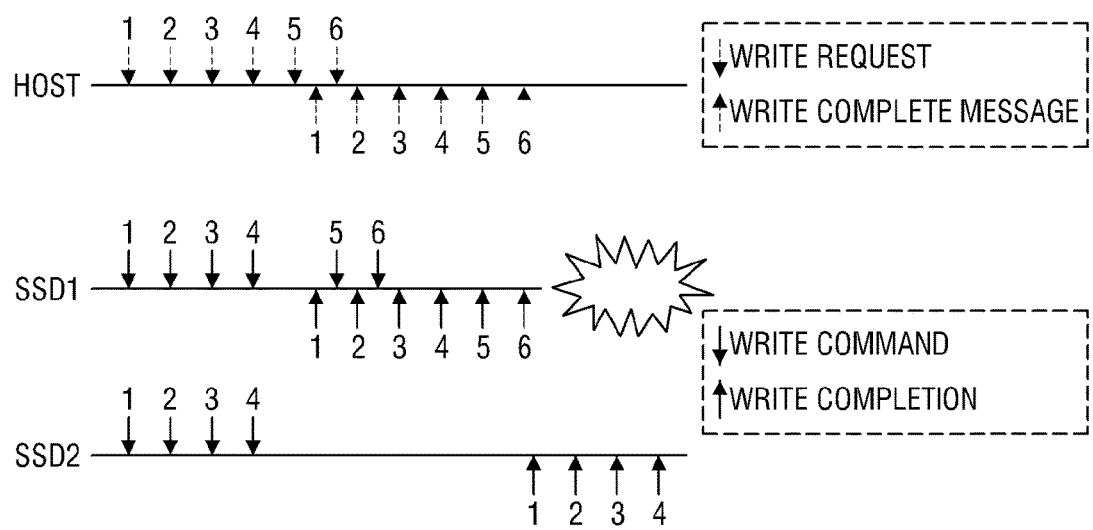

FIG. 3C illustrates an example of a case where a write request is transmitted in a non-blocking manner.

Referring to FIG. 3C, the host may make a write request for another data before receiving a write complete message. As in the example of FIG. 3C, the host may make a write request for another data corresponding to the depth of a command queue of each SSD before receiving a write complete message for data 1 that it requested to be written.

Each of SSD 1 and SSD 2 may store a write command for data requested by the host to be written in its command queue and then write the data. In addition, when one of SSD 1 and SSD 2 completes writing the data, it may transmit a write complete message to the host.

Even in this case, there still exists a risk of loss of data that exceeds the depth of the command queue. In FIG. 3C, it is assumed that the depth of the command queue of each of SSD 1 and SSD 2 is four. In this case, when SSD 1 completes writing data 1, a write complete message for data 1 is transmitted to the host, and a write command for data 5 is transmitted to the command queue of SSD 1. In addition, when SSD 1 completes writing data 2, a write complete message for data 2 is transmitted to the host, and a write command for data 6 is transmitted to the command queue of SSD 1.

However, since SSD 2 is writing data 1 at a time when SSD 1 completes writing data 6 and the depth of the command queue of SSD 2 is four, the write commands for data 5 and data 6 cannot be transmitted to SSD 2.

Therefore, when SSD 1 breaks down after completing writing data 5 and data 6, if data 5 and data 6 are not stored in the host memory, the write commands for data 5 and data 6 cannot be transmitted to SSD 2. In this case, data 5 and data 6 may be lost.

Figure 4A:
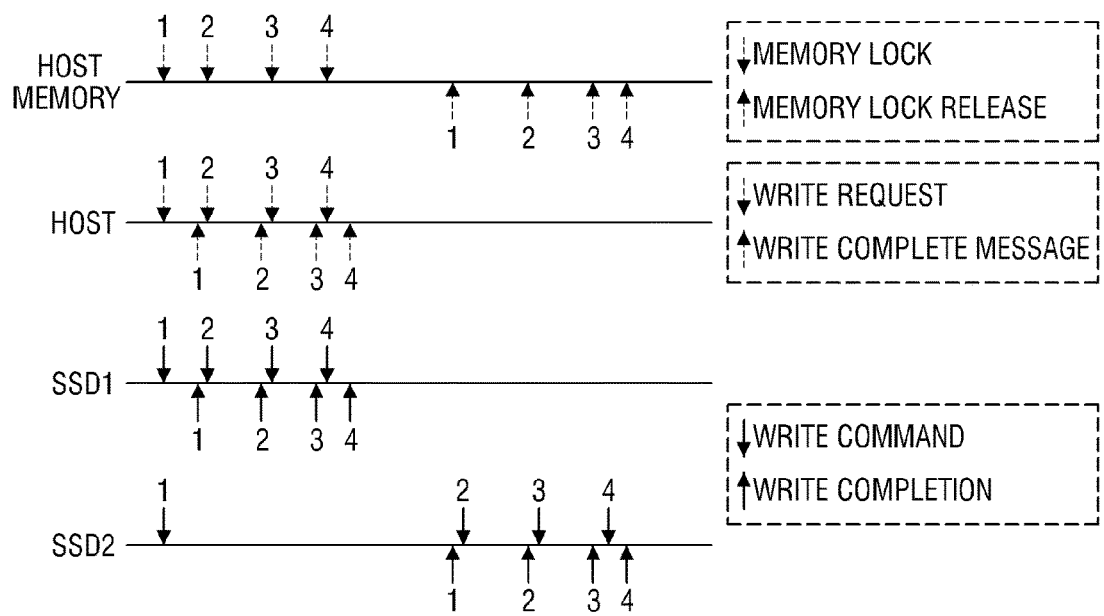
FIGS. 4A and 4B are diagrams illustrating a process of setting a memory lock and transmitting a write complete message.
Figure 4B:
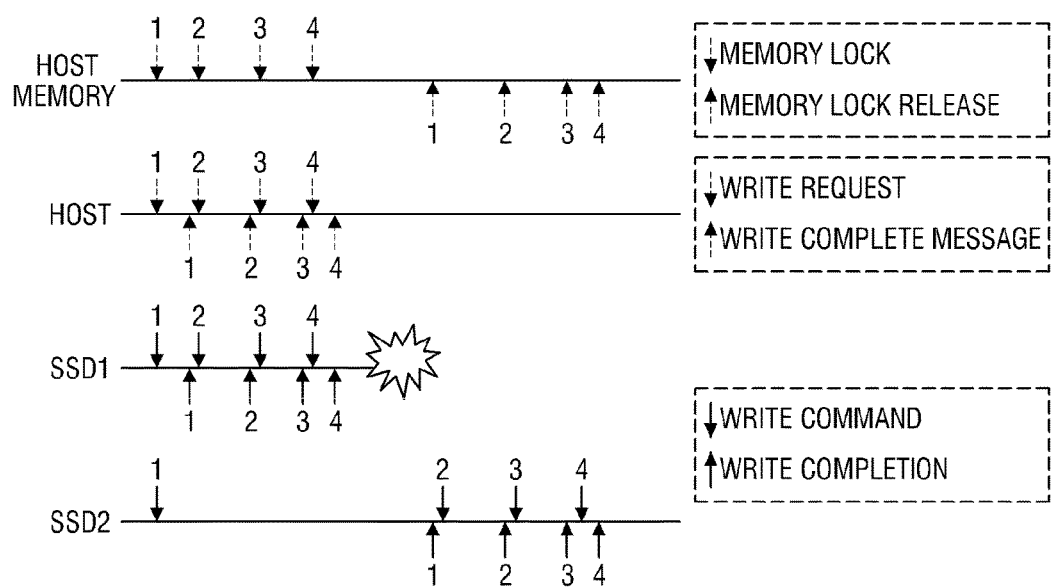

FIGS. 4A and 4B are diagrams illustrating a process of setting a memory lock and transmitting a write complete message.

In the example of FIGS. 4A and 4B, it is assumed for ease of description that a plurality of mirroring storage devices include two SSDs. However, example embodiments of the inventive concepts are not limited to this assumption, and the mirroring storage devices may also include two or more SSDs or may also include one or more SSDs and one or more HDDs.

Referring to FIG. 4A, when receiving a data write request from the host 120, the data mirroring control apparatus 110 may set a memory lock on data requested by the host 120 to be written among data stored in the host memory.

For example, in FIG. 4A, when receiving a write request for data 1 from the host 120, the data mirroring control apparatus 110 may set a memory lock on data 1 stored in the host memory. Likewise, the data mirroring control apparatus 110 may set a memory lock on each of data 2 through 4 when receiving a write request for each of data 2 through 4 from the host 120.

A memory lock on data is released when SSD 1 and SSD 2 complete writing the data. In the example of FIG. 4A, since the data writing completion speed of SSD 2 is slower than that of SSD 1, the data mirroring control apparatus 110 may release the memory lock on data 1 after SSD 2 completes writing data 1. In addition, the memory lock on each of data 2 through 4 may be released after SSD 2 completes writing each of data 2 through 4.

When one of SSD 1 and SSD 2 completes writing data, the data mirroring control apparatus 110 may immediately transmit a write complete message for the data to the host 120. In the example of FIG. 4A, since the writing completion speed of SSD 1 is faster than that of SSD 2 for each of data 1 through 4, the data mirroring control apparatus 110 transmits a write complete message for data 1 to the host 120 when SSD 1 completes writing data 1. Likewise, the data mirroring control apparatus 110 transmits a write complete message for each of data 2 through 4 to the host 120 when SSD 1 completes writing each of data 2 through 4.

The host 120 does not transmit a write request for another data until it receives a write complete message for data that it requested to be written (thus operating in a blocking manner). Specifically, the host 120 transmits a write request for data 2 to the data mirroring control apparatus 110 only after receiving a write complete message for data 1 from the data mirroring control apparatus 110. Likewise, the host 120 transmits a write request for data 3 to the data mirroring control apparatus 110 only after receiving a write complete message for data 2 and transmits a write request for data 4 to the data mirroring control apparatus 110 only after receiving a write complete message for data 3.

The data mirroring control apparatus 110 transmits a write command for data requested by the host 120 to be written to SSD 1 and SSD 2. Specifically, the data mirroring control apparatus 110 does not transmit a write command for next data until the execution of a previously received write command is completed (thus operating in a blocking manner). In the example of FIG. 4A, after SSD 1 completes writing data 1, a write command for data 2 is transmitted to SSD 1. Likewise, after SSD 2 completes writing data 1, a write command for data 2 is transmitted to SSD 2.

Referring to FIG. 4B, it is assumed that SSD 1 breaks down before write commands for data 2 through 4 are transmitted to SSD 2.

In this case, the memory lock set on each of data 2 through 4 is not released until SSD 2 completes writing data 2 through 4. Therefore, the data mirroring control apparatus 110 can transmit the write commands for data 2 through 4 stored in the host memory to SSD 2. Hence, unlike in the case of FIG. 3B, data loss due to the breakdown of SSD 1 can be prevented.

In other words, a memory lock on data being written is maintained until all of the two SSDs complete executing a write command for the data. Thus, even if an SSD which processed the write command first breaks down, data loss can be prevented.

In addition, when one of the two SSDs completes writing data, a write complete message is immediately transmitted to the host 120, so that next data can be written. This can improve the writing completion speed of the entire storage devices.

Figure 5A:
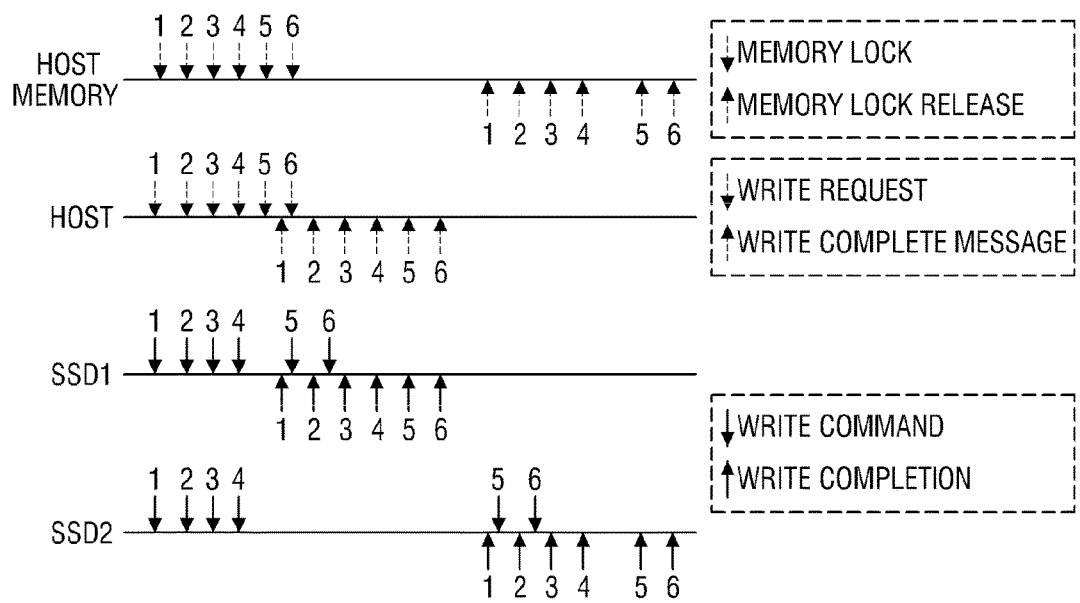
FIGS. 5A and 5B are diagrams illustrating a process of setting a memory lock and transmitting a write complete message in a case where a write command is transmitted in a non-blocking manner.
Figure 5B:
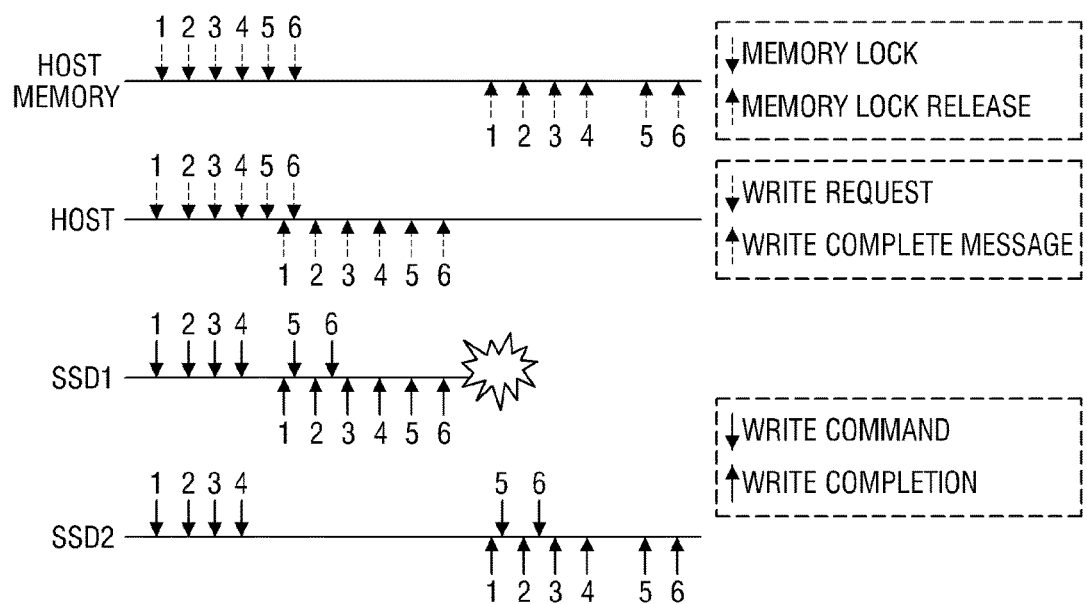

FIGS. 5A and 5B are diagrams illustrating a process of setting a memory lock and transmitting a write complete message in a case where a write command is transmitted in a non-blocking manner.

Referring to FIG. 5A, the host 120 may transmit a write request for data to the data mirroring control apparatus 110 regardless of whether a write complete message for other data that the host 120 previously requested to be written has been received.

In addition, the data mirroring control apparatus 110 may transmit a write command for data requested by the host 120 to be written to each of SSD 1 and SSD 2 regardless of whether SSD 1 and SSD 2 are writing data.

Specifically, a write command for data requested by the host 120 to be written is stored in a command queue of each of SSD 1 and SSD 2. In addition, each of SSD 1 and SSD 2 writes the data using the write command stored in the command queue.

According to at least one example embodiment of the inventive concepts, a write command may be transmitted to each of SSD 1 and SSD 2 in view of the depth of the command queue of each of SSD 1 and SSD 2.

In the example of FIG. 5A, the depth of the command queue of each of SSD 1 and SSD 2 is four, and write commands for data 1 through 4 are first transmitted to the command queues of SSD 1 and SSD 2. After SSD 1 completes executing the write command for data 1, a write command for data 5 is transmitted to the command queue of SSD 1. In addition, after SSD 1 completes executing the write command for data 2, a write command for data 6 is transmitted to the command queue of SSD 1.

Likewise, when SSD 2 completes executing the write command for data 1, the write command for data 5 is transmitted to the command queue of SSD 2. In addition, after SSD 2 completes executing the write command for data 2, the write command for data 6 is transmitted to the command queue of SSD 2.

A memory lock is set on each of data 1 through 6 stored in the host memory when a write request for each of data 1 through 6 is transmitted from the host 120 and is released when SSD 1 and SSD 2 complete writing each of data 1 through 6.

In addition, when one of SSD 1 and SSD 2 completes writing data requested by the host 120 to be written, the data mirroring control apparatus 110 may transmit a write complete message for the data to the host 120.

Specifically, in the example of FIG. 5A, when SSD 1 completes writing each of data 1 through 6, the data mirroring control apparatus 110 may transmit a write complete message for each of data 1 through 6 to the host 120.

On the other hand, the memory lock set on each of data 1 through 6 is released when all storage devices complete writing each of data 1 through 6, that is, when SSD 2, the slower device with respect to SSD 1 in the example shown I FIG. 5A, completes writing each of data 1 through 6.

Referring to FIG. 5B, SSD 1 breaks down before the write commands for data 5 and 6 are transmitted to the command queue of SSD 2.

In this case, the memory lock set on each of data 5 and 6 stored in the host memory is not released until SSD 2 completes writing each of data 5 and 6. Therefore, the data mirroring control apparatus 110 can control SSD 2 to write data 5 and 6 by transmitting the write commands for data 5 and 6 with the memory locks to SSD 2.

That is, unlike in the case of FIG. 3C, even if SSD 1 breaks down, since the memory lock set on each of data 5 and 6 stored in the host memory is maintained, the write commands for data 5 and 6 with the memory locks can be transmitted to SSD 2, thereby preventing the loss of data 5 and 6.

In addition, when one of the two SSDs completes writing data, a write complete message for the data is immediately transmitted to the host 120, so that next data can be written. This can improve the writing completion speed of the entire storage devices.

Figure 6A:
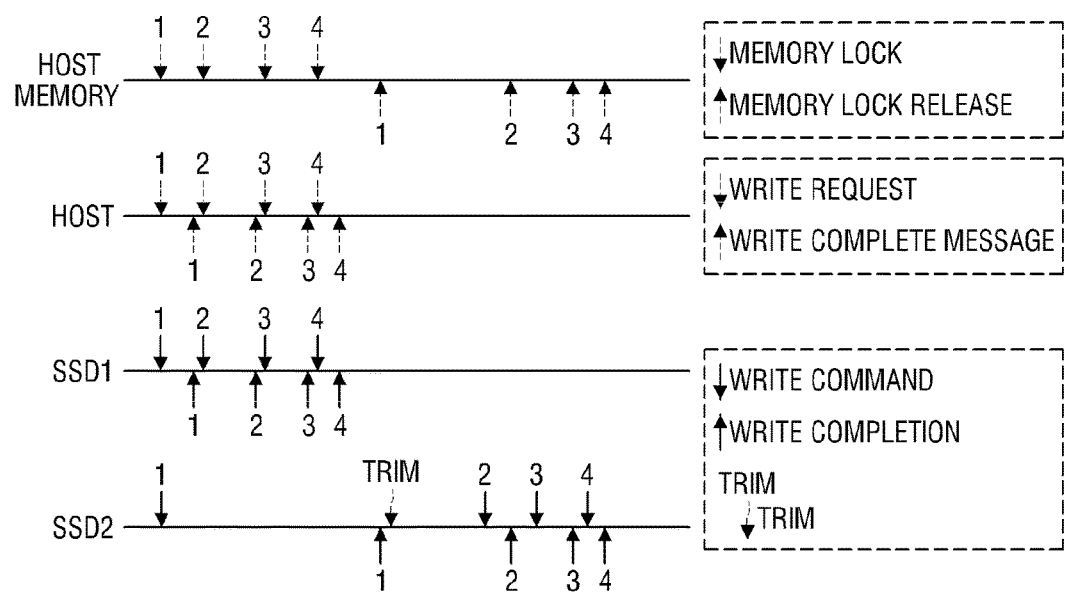
FIGS. 6A and 6B are diagrams illustrating a process of transmitting a trim command.
Figure 6B:
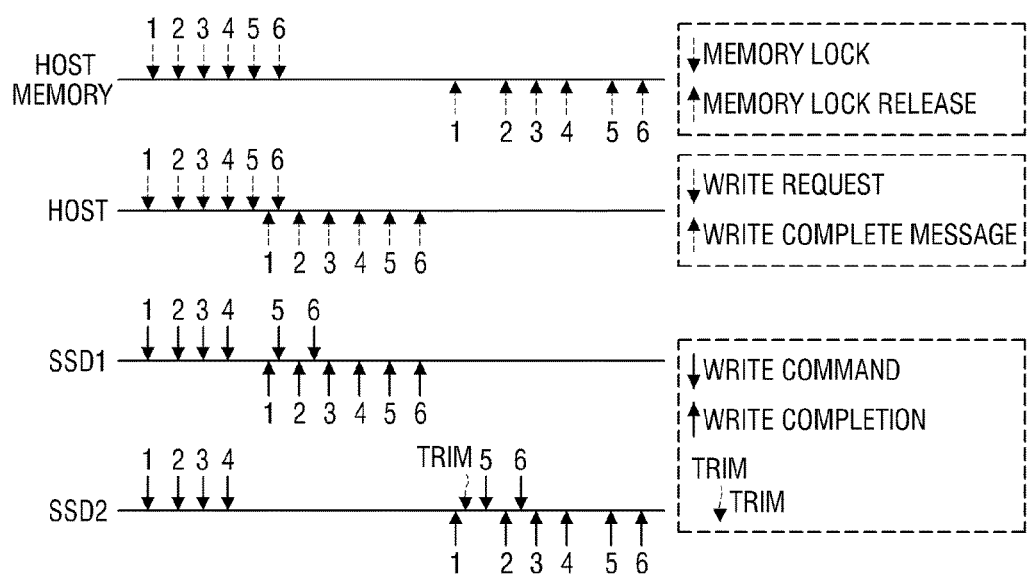

FIGS. 6A and 6B are diagrams illustrating a process of transmitting a trim command.

Referring to FIG. 6A, SSD 1 completes writing data 1 through 4 before a write command for data 2 is transmitted to SSD 2.

Here, the data mirroring control apparatus 110 may transmit a trim command to SSD 2 based on information about the writing of data 2 through 4 to SSD 1.

Unlike an HDD, a flash memory-based storage device such as an SSD cannot immediately record data in a page that is not empty. The storage device can record data only after existing data is erased. Specifically, an SSD is erased on a block-by-block basis. Therefore, to overwrite data to a block that is not empty, data excluding invalid data from data stored in the block should be transferred to another block or a cache within the SSD, and then the data stored in the block should be erased.

Here, if it is possible to explicitly inform which data is invalid data by using a trim command, the amount of data that should be transferred to another block during an erase operation for overwriting can be reduced. Specifically, the same data is stored in SSD 1 and SSD 2. Therefore, if data 2 through 4 are overwritten to SSD 1, data stored in blocks of SSD 2 to which data 2 through 4 are to be written may be understood as invalid data.

For example, if data is overwritten to 1,000th through 1,500th blocks of SSD 1, data stored in 1,000th through 1,500th blocks of SSD 2 which has not yet executed write commands for data 2 through 4 are invalid data.

Therefore, the data mirroring control apparatus 110 may explicitly inform SSD 2 using a trim command that data stored at addresses to which data 2 through 4 are to be written are invalid data before the write commands for data 2 through 4 are transmitted to SSD 2. The trim command enables SSD 2 to reduce the amount of data that should be transferred to other blocks during an erase operation for overwriting, thereby improving the performance of SSD 2 and reducing the wear and tear of SSD 2.

Referring to FIG. 6B, SSD 1 completes writing data 5 and 6 at a time when SSD 2 which has not yet received write commands for data 5 and 6 completes executing a write command for data 1.

Therefore, the data mirroring control apparatus 110 may transmit a trim command to SSD 2 based on information about the writing of data 5 and 6 to SSD 1.

Figure 7A:
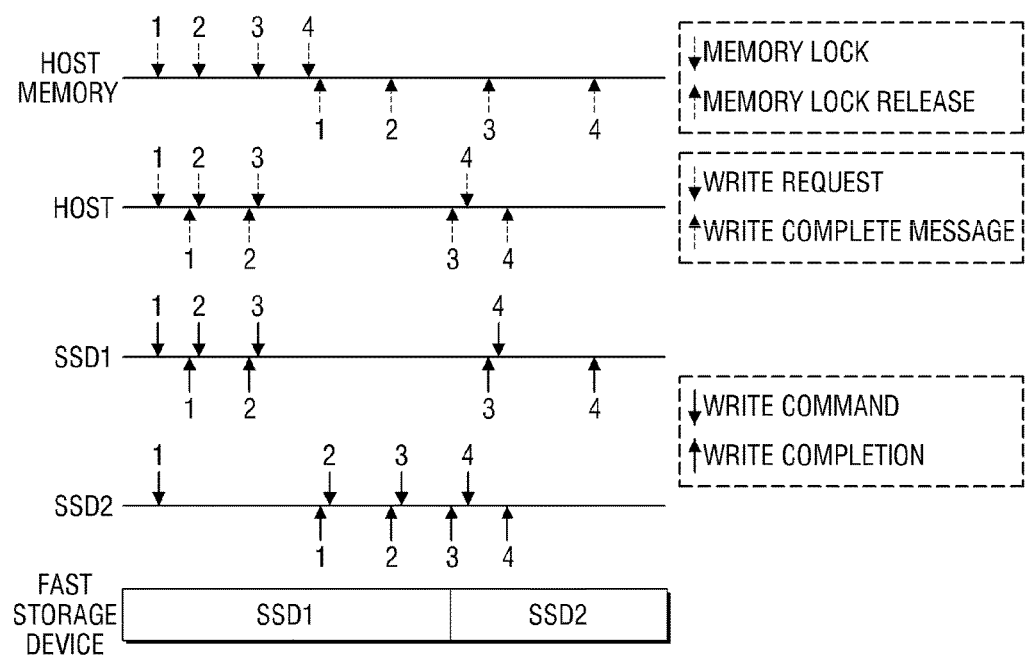
FIGS. 7A through 7C are diagrams illustrating a fast storage device.
Figure 7B:
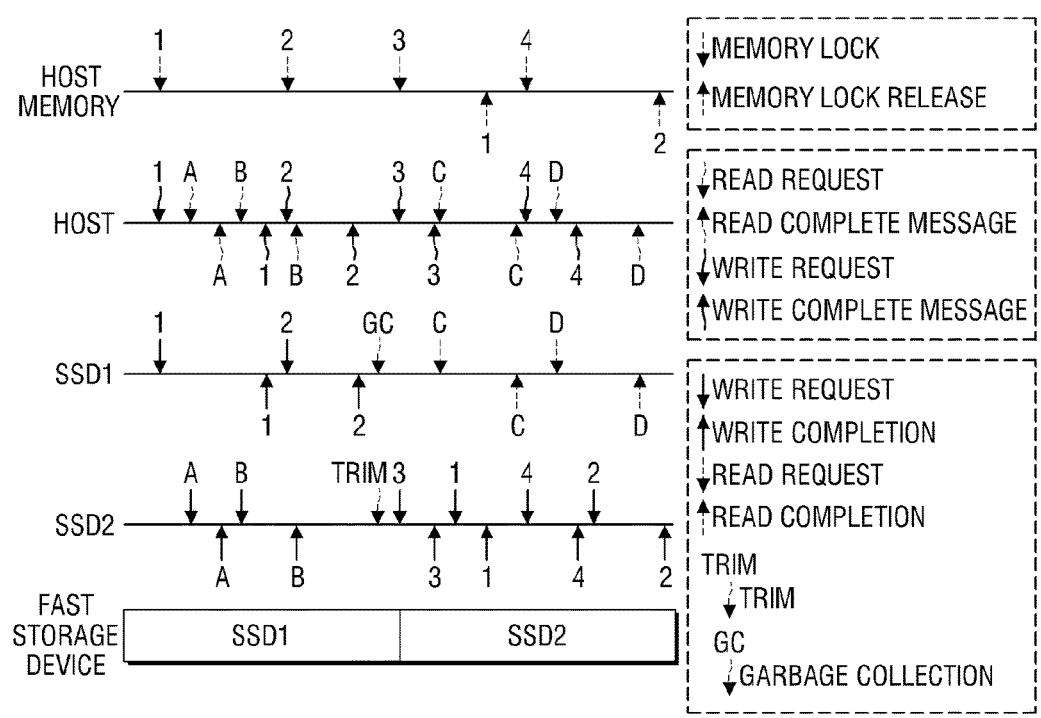
Figure 7C:
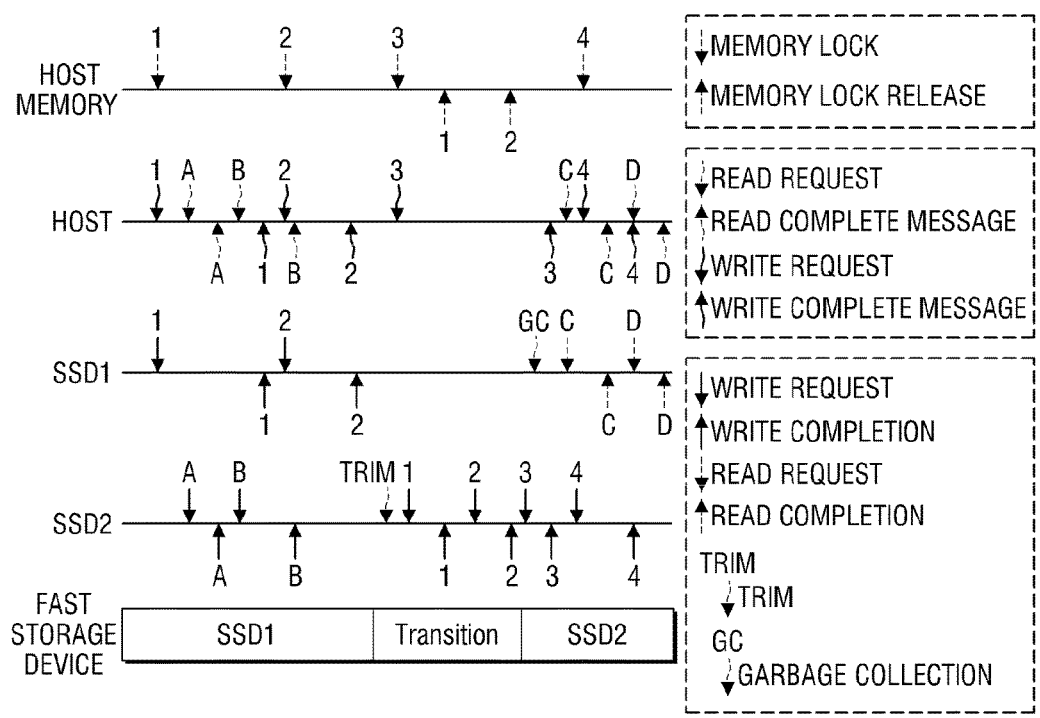

FIGS. 7A through 7C are diagrams illustrating a fast storage device.

Referring to FIG. 7A, the data mirroring control apparatus 110 may set a storage device that is fastest with respect to completing the writing of data requested by the host 120 to be written as a fast storage device.

Specifically, in FIG. 7A, since SSD 1 completes writing data 1 and 2 first, SSD 1 may be set as the fast storage device.

On the other hand, since SSD 2 completes writing data 3 and 4 first, the data mirroring control apparatus 110 may change the fast storage device to SSD 2 at a time when SSD 2 completes writing data 3.

Referring to FIG. 7B, the data mirroring control apparatus 110 may transmit a write command to SSD 1 set as the fast storage device and transmit a read command to SSD 2. For example, according to at least one example embodiment, when a read and write command are transmitted at the same time, the write command may be sent to a storage device set as a fast storage and the read command may be sent to a storage device set as the slow storage device (or not set as a fast storage device).

The fast storage device may be set and changed periodically or non-periodically according to, for example, a WAF, the size of a free block, the occurrence of a write delay, etc.

In the example of FIG. 7B, when a WAF value of SSD 1 initially set as the fast storage device is higher than that of SSD 2, the fast storage device may be changed to SSD 2.

Further, in accordance with at least one example embodiment of the inventive concepts, when SSD 1 has a write delay or when the size of the free block is reduced to a predetermined or, alternatively, reference size or less due to the execution of a write command by SSD 1, the fast storage device may be changed to SSD 2.

In the example of FIG. 7B, after SSD 1 completes writing data 2, the fast storage device is changed to SSD 2. Therefore, a write command may be transmitted to SSD 2.

Here, the data mirroring control apparatus 110 may transmit write commands for data 1 and 2 with memory locks to SSD 2.

In this case, the write commands for data 1 and 2 may be transmitted alternately with write commands for data 3 and 4 requested by the host 120 to be written after the fast storage device is changed. However, according to at least one example embodiment of the inventive concepts, in an example alternative to that shown in FIG. 7B, the write commands for data 1 and 2 written to SSD 1 can be preferentially transmitted to SSD 2.

When the fast storage device is changed to SSD 2, the data mirroring control apparatus 110 may transmit a trim command to SSD 2 based on information about the writing of data 1 and 2 to SSD 1 before transmitting the write commands for data 1 and 2 to SSD 2. Specifically, if the write commands for data 1 and 2 are overwrite commands, it can be understood that data previously stored at addresses in SSD 1 to which data 1 and 2 were written are invalid data. Therefore, the data mirroring control apparatus 110 may explicitly inform SSD 2 using a trim command that data stored at addresses in SSD 2 to which data 1 and 2 are to be written are invalid data. SSD 2 which receives the trim command can reduce the amount of data that should be transferred to other blocks during an erase operation needed to overwrite data 2 through 4. As a result, the performance of SSD 2 can be improved, and the wear and tear of SSD 2 can be reduced.

When the fast storage device is changed to SSD 2, the data mirroring control apparatus 110 may control SSD 1 to perform garbage collection by transmitting a garbage collection command to SSD 1.

For example, when the fast storage device is changed to SSD 2, a write command is transmitted to SSD 2, and a read command is transmitted to SSD 1. Therefore, SSD 1 does not perform a write operation. Here, the data mirroring control apparatus 110 controls SSD 1 to perform garbage collection before the fast storage device is changed again to SSD 1. Since pages storing invalid data are collected and erased through garbage collection, free space can be secured in advance. This can improve the write performance of SSD 1 when the fast storage device is changed to SSD 1 again.

In the example of FIG. 7B, even if the fast storage device is changed to SSD 2, the latest data is stored in SSD 1 until SSD 2 completes writing data 1 and 2.

Therefore, as in the example of FIG. 7C, the data mirroring control apparatus 110 may match data stored in SSD 2 and data stored in SSD 1 by transmitting the write commands for data 1 and 2 with the memory locks to SSD 2 before changing the fast storage device to SSD 2.

Then, when SSD 2 completes writing data 1 and 2, the data mirroring control apparatus 110 may change the fast storage device to SSD 2.

In this case, unlike in the case of FIG. 7B, the latest data may always be stored in the fast storage device.

The data mirroring control apparatus 110 may transmit a trim command to SSD 2 based on information about the writing of data 1 and 2 to SSD 1 before transmitting the write commands for data 1 and 2 to SSD 2.

In addition, when the fast storage device is changed to SSD 2, the data mirroring control device 110 may control SSD 1 to perform garbage collection by transmitting a garbage collection command to SSD 1.

In FIGS. 7B and 7C, only a write command is transmitted to the fast storage device, and a read command is transmitted to the other storage device. However, example embodiments of the inventive concepts are not limited thereto.

For example, when load balancing is required or desired between storage devices or when there is a read request for data recently written to the fast storage device, a read command may be transmitted to the fast storage device.

Figure 8:
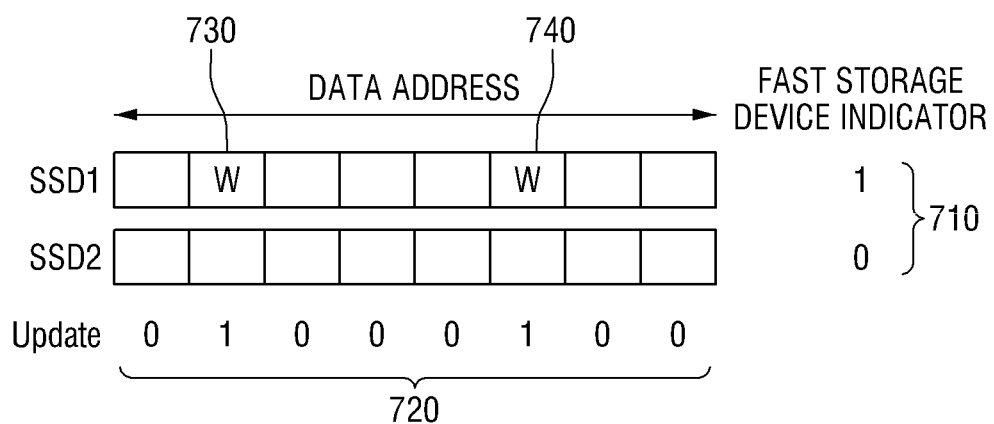
FIG. 8 is a diagram illustrating data recovery in a case where a host has a failure.

FIG. 8 is a diagram illustrating data recovery in a case where the host 120 has a failure.

Referring to FIG. 8, when the host 120 is rebooted due to an unexpected failure, the data mirroring control apparatus 110 may match data stored in a plurality of storage devices based on data stored in a fast storage device.

Since the latest data is stored in the fast storage device, the data stored in the storage devices may be matched with the data stored in the fast storage device.

Specifically, when the host 120 is rebooted, the data stored in the fast storage device may be compared with the data stored in the other storage devices to determine whether the two sets of stored data match.

Here, which of the storage devices is the fast storage device can be identified by a fast storage device indicator 710 stored in each of the storage devices. In the example of FIG. 8, SSD 1 having the fast storage device indicator 710 set to one is the fast storage device.

Whether there is any data that does not match between SSD 1 and SSD 2 can be determined using an update bitmap 720.

Specifically, the data mirroring control apparatus 110 may divide the whole data area of each of a plurality of storage devices 130 into N chunks and determine whether data stored in each of the N chunks of each of the storage devices 130 matches data stored in a corresponding one of the N chunks of another storage device 130 by using an update bit corresponding to each of the N chunks.

In the example of FIG. 8, the data area of each of SSD 1 and SSD 2 is divided into eight chunks, and the update bitmap 720 for the eight chunks is illustrated.

Each bit included in the update bitmap 720 corresponds to one of the chunks and indicates whether data stored in a chunk of SSD 1 matches data stored in a corresponding chunk of SSD 2.

Specifically, if data is written only to SSD 1 (i.e., the fast storage device) among SSD 1 and SSD 2, update bits for chunks 730 and 740 to which the data was written may be set to one.

On the other hand, if data is written to both SSD 1 and SSD 2, update bits for chunks to which the data was written may be set to zero. Also, chunks to which no data was written may be set to zero.

Therefore, there is no need to compare the whole data stored in SSD 1 and SSD 2. Instead, data stored only in chunks whose update bits were set to one in the update bitmap 720 may be compared, thereby reducing data recovery time.

The method of matching data stored in a plurality of storage devices when the host 120 has a failure is not limited to the above method using the update bitmap 720 illustrated in FIG. 8.

For example, since a memory lock is maintained on data written to the fast storage device but not written to a slow storage device among data stored in the host memory, the data with the memory lock is not erased or modified until it is written to the slow storage device. Therefore, the data mirroring control apparatus 110 may log a list of data with memory locks stored in the host memory and store the list of data in a nonvolatile memory or an area of a storage device. Then, when the host 120 is rebooted, the data mirroring control apparatus 110 may transmit a write command for data on the list to the slow storage device in order to match data stored in the slow storage device with data stored in the fast storage device.

Figure 9:
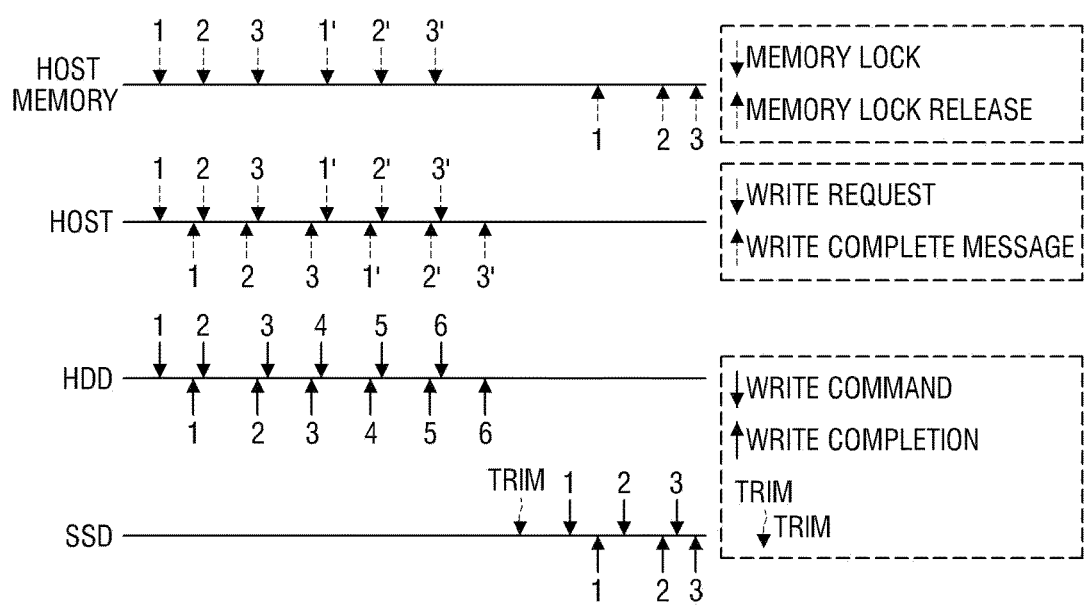
FIG. 9 is a diagram illustrating data mirroring control in a case where a plurality of storage devices include a solid state drive (SSD) and a hard disk drive (HDD)

FIG. 9 is a diagram illustrating data mirroring control in a case where a plurality of storage devices include an SSD and an HDD.

Referring to FIG. 9, a plurality of mirroring storage devices may include at least one HDD and at least one SSD.

The data mirroring control apparatus 110 may set the HDD as a fast storage device such that data can be written first to the HDD. Then, the data mirroring control apparatus 110 may change the fast storage device to the SSD such that the same data as the data written to the HDD can be written to the SSD.

The data mirroring control apparatus 110 may convert a write command for data requested by the host 120 to be written randomly into a sequential write command and transmit the sequential write command to the HDD.

Specifically, in the example of FIG. 9, write requests 1', 2' and 3' are overwrite requests to addresses at which data 1, 2 and 3 are stored. Here, the data mirroring control apparatus 110 may convert write commands, which correspond to the write requests 1', 2' and 3' for the data requested by the host 120, into sequential write commands 4, 5 and 6 and transmit the sequential write commands 4, 5 and 6 to the HDD.

Generally, the HDD has a larger available space than the SSD. Therefore, if data mirroring is applied between the HDD and the SSD, more available space is created in the HDD. In addition, in accordance with the physical nature of the HDD, the sequential write performance of the HDD is more superior than the random write performance of the HDD. Therefore, the data mirroring control apparatus 110 may convert data requested by the host 120 to be written randomly into a log form such that the data can be stored sequentially. Accordingly, the write performance of the HDD can be improved.

When the fast storage device is changed to the SSD, the data mirroring control apparatus 110 may transmit information about invalid data to the SSD using a trim command based on information about the writing of data to the HDD.

In the example of FIG. 9, the data mirroring control apparatus 110 may transmit to the SSD a trim command indicating that the data 1, 2 and 3, among data stored in the HDD, are invalid data and then transmit write commands for the data 1, 2 and 3 to the SSD.

The above method can improve the write performance of the HDD and reduce the wear and tear of the SSD.

Figure 10:
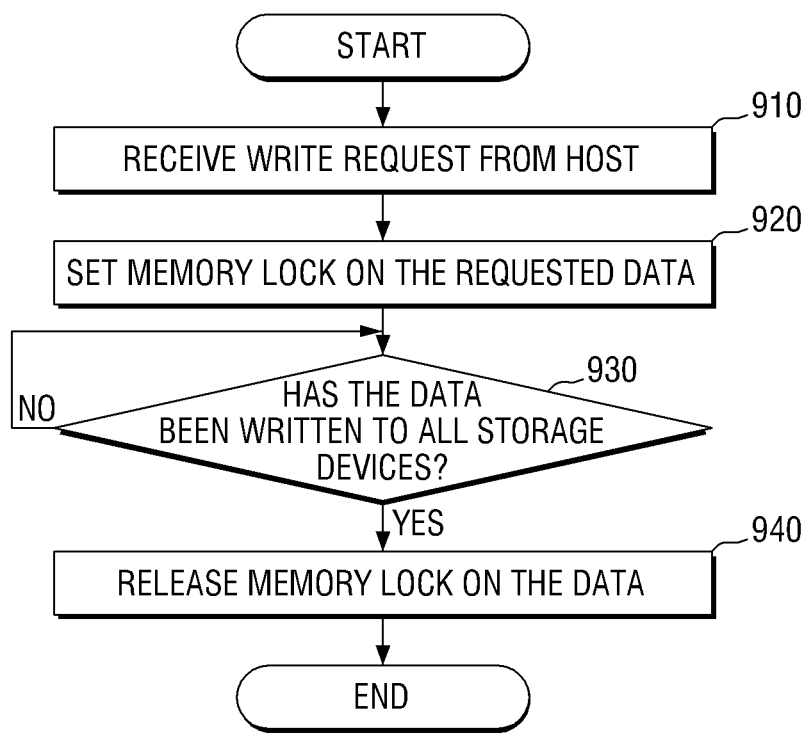
FIG. 10 is a flowchart illustrating a process of setting a memory lock According to at least one example embodiment of the inventive concepts at least one example embodiment of the inventive concepts.

FIG. 10 is a flowchart illustrating a process of setting a memory lock according to at least one example embodiment of the inventive concepts.

Referring to FIG. 10, when receiving a write request from the host 120 (step 910), the data mirroring control apparatus 110 may set a memory lock on data requested by the host 120 to be written among data stored in the host memory (step 920).

After the data with the memory lock is written to all of a plurality of storage devices 130 (step 930), the data mirroring control apparatus 110 may release the memory lock on the data (step 940).

In other words, the memory lock on the data is not released until the data is written to all of the storage devices 130.

Figure 11:
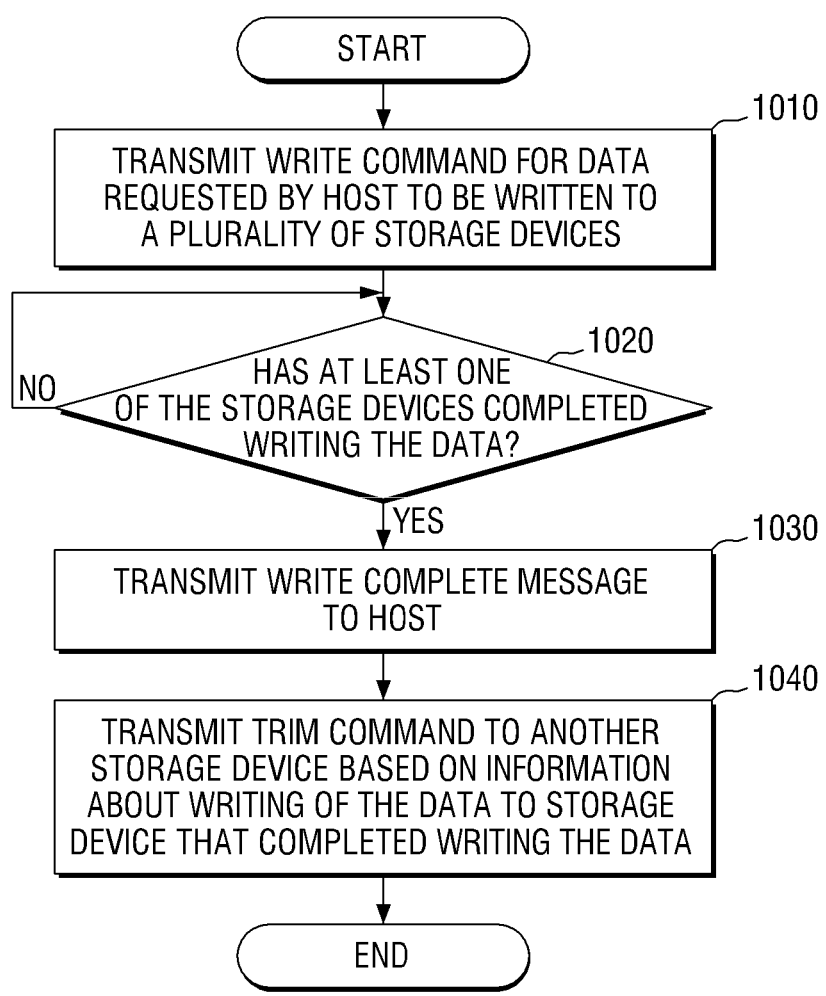
FIG. 11 is a flowchart illustrating a process of transmitting a write command and a write complete message According to at least one example embodiment of the inventive concepts at least one example embodiment of the inventive concepts.

FIG. 11 is a flowchart illustrating a process of transmitting a write command and a write complete message according to at least one example embodiment of the inventive concepts. Referring to FIG. 11, the data mirroring control apparatus 110 may transmit a write command for data requested by the host 120 to be written to a plurality of storage devices 130 (step 1010).

Here, the write request of the host 120 and the write command for the data requested by the host 120 to be written may be transmitted to each of the storage devices 130 in a blocking manner or a non-blocking manner.

When at least one of the storage devices 130 completes writing the data requested by the host 120 to be written (step 1020), the data mirroring control apparatus 110 may transmit a write complete message for the data to the host 120 (step 1030).

According to at least one example embodiment of the inventive concepts, when at least one of the storage devices 130 completes writing the data requested by the host 120 to be written, the data mirroring control apparatus 110 may transmit a trim command to a storage device, which has not yet received the write command for the data, based on information about the writing of the data to the storage device which completed writing the data (step 1040).

Figure 12:
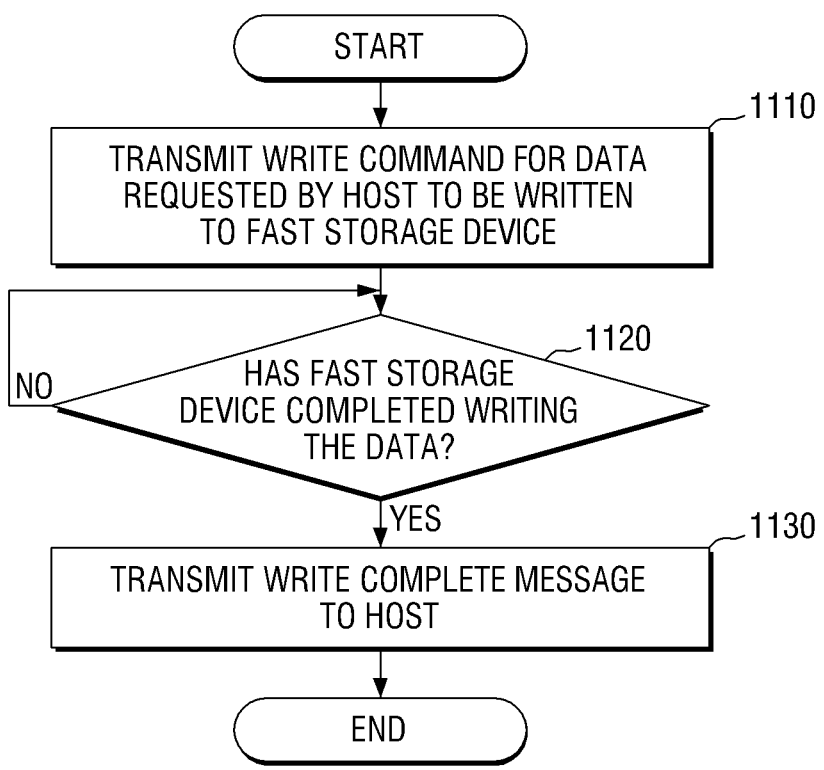
FIG. 12 is a flowchart illustrating a process of transmitting a write command and a write complete message according to at least one example embodiment of the inventive concepts.

FIG. 12 is a flowchart illustrating a process of transmitting a write command and a write complete message according to another embodiment of at least one example embodiment of the inventive concepts.

Referring to FIG. 12, the data mirroring control apparatus 110 may transmit a write command for data requested by the host 120 to be written to a fast storage device (step 1110).

In other words, the data mirroring control apparatus 110 may transmit the write command only to a storage device set as the fast storage device among a plurality of storage devices 130.

According to at least one example embodiment of the inventive concepts, if the storage devices 130 include at least one HDD and at least one SSD, the data mirroring control apparatus 110 may set an HDD as the fast storage device, convert a write command for data requested by the host 120 into a sequential write command, and transmit the sequential write command to the HDD.

The data mirroring control apparatus 110 may set at least one of the storage devices 130 as the fast storage device and change the fast storage device periodically or non-periodically.

In addition, According to at least one example embodiment of the inventive concepts, the data mirroring control apparatus 110 may transmit a read command to each storage device not set as the fast storage device among the storage devices 130.

However, example embodiments of the inventive concepts are not limited thereto. When load balancing is required or desired between the storage devices 130 or when there is a read request for data recently written to the fast storage device, a read command may be transmitted to the fast storage device.

When the fast storage device completes writing the data requested by the host 120 to be written (step 1120), the data mirroring control apparatus 110 may transmit a write complete message to the host 120 (step 1130).

Figure 13:
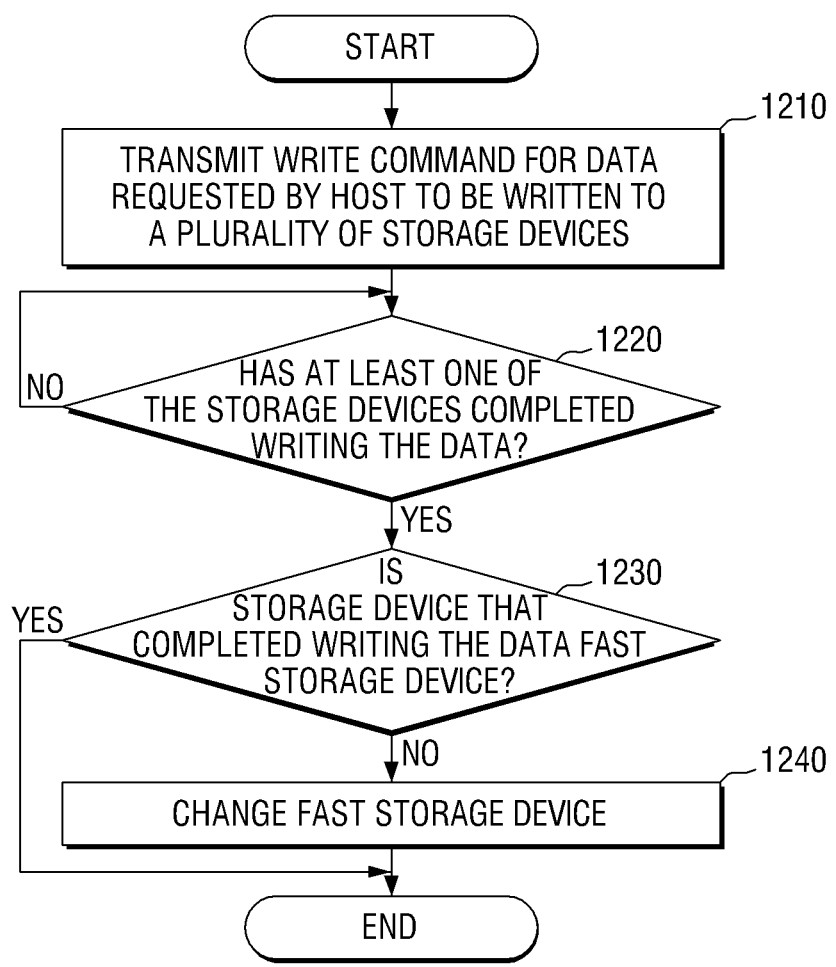
FIG. 13 is a flowchart illustrating a process of changing a fast storage device According to at least one example embodiment of the inventive concepts at least one example embodiment of the inventive concepts.

FIG. 13 is a flowchart illustrating a process of changing a fast storage device according to at least one example embodiment of the inventive concepts. Referring to FIG. 13, the data mirroring control apparatus 110 may transmit a write command for data requested by the host 120 to be written to a plurality of mirroring storage devices 130 (step 1210).

According to at least one example embodiment of the inventive concepts, a storage device which writes the requested data fastest may be set as a fast storage device.

Therefore, when one of the storage devices 130 completes writing the data requested by the host 120 to be written (step 1220), it may be determined whether the storage device is the fast storage device (step 1230).

If the storage device which completed writing the requested data first, from among the plurality of storage device, is not currently set as the fast storage device, the fast storage device may be changed, for example by the data mirroring control apparatus 110, to the storage device which completed writing the requested data first (step 1240).

Figure 14:
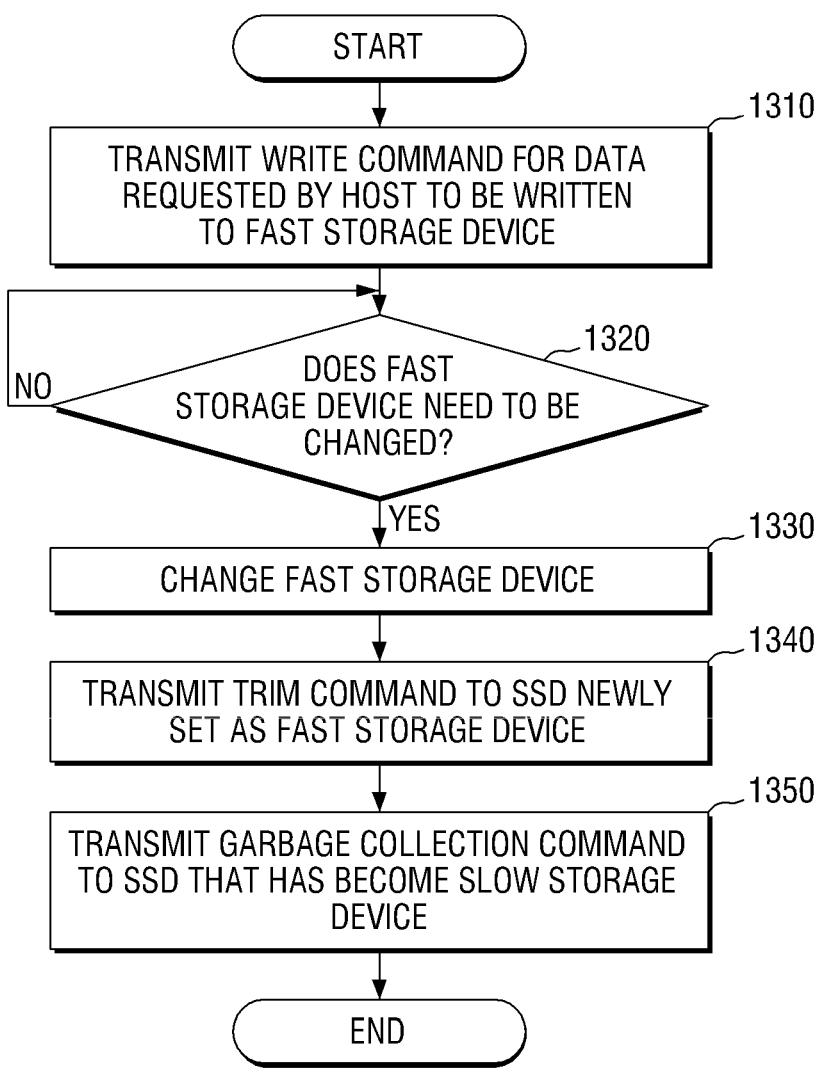
FIG. 14 is a flowchart illustrating a process of changing a fast storage device according to at least one example embodiment of the inventive concepts.

FIG. 14 is a flowchart illustrating a process of changing a fast storage device according to at least one example embodiment of the inventive concepts.

Referring to FIG. 14, the data mirroring control apparatus 110 may transmit a write command for data requested by the host 120 to be written to a fast storage device (step 1310).

Then, the data mirroring control apparatus 110 may determine periodically or non-periodically whether the fast storage device needs to be changed (step 1320) and change the fast storage device based on the determination result (step 1330).

Specifically, unlike in the case of FIG. 12, whether the fast storage device needs to be changed may be determined periodically or non-periodically according to, for example, a WAF, the size of a free block, the occurrence of a write delay, etc.

For example, when a WAF value of the fast storage device is higher than that of another storage device, the data mirroring control apparatus 110 may change the fast storage device.

In another example, when the fast storage device has a write delay or when the size of the free block is reduced to a predetermined or, alternatively, size or less by the execution of a write command by the fast storage device, the data mirroring control apparatus 110 may change the fast storage device.

When the fast storage device is changed to an SSD, the data mirroring control apparatus 110 may transmit a trim command to the SSD based on information about the writing of data to the previous fast storage device (step 1340).

In addition, when the SSD set as the fast storage device becomes a slow storage device, the data mirroring control apparatus 110 may transmit a garbage collection command to the SSD (step 1350).

Figure 15:
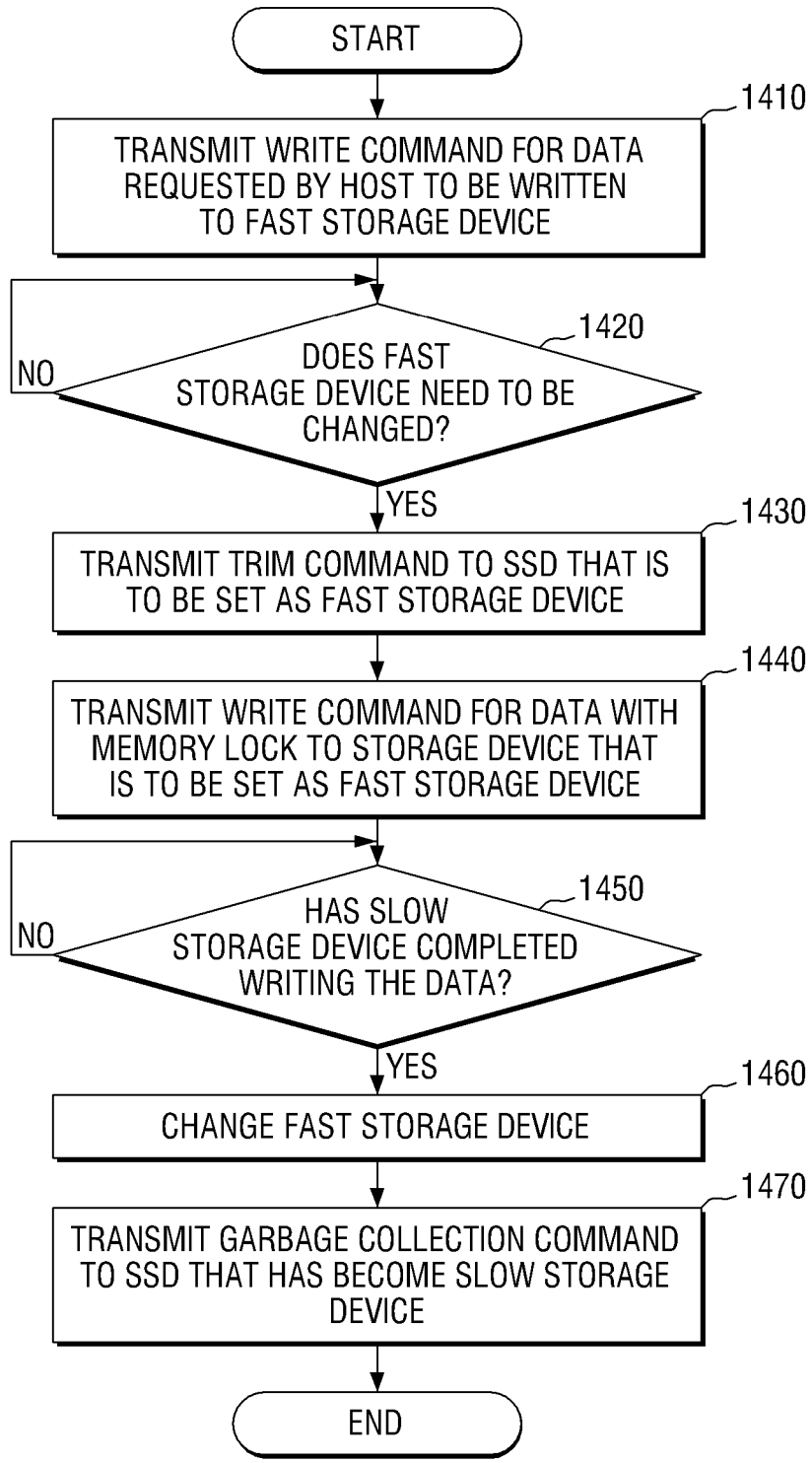
FIG. 15 is a flowchart illustrating a process of changing a fast storage device according to at least one example embodiment of the inventive concepts.

FIG. 15 is a flowchart illustrating a process of changing a fast storage device according to at least one example embodiment of the inventive concepts.

Referring to FIG. 15, the data mirroring control apparatus 110 may transmit a write command for data requested by the host 120 to be written to a fast storage device (step 1410).

Then, the data mirroring control apparatus 110 may determine periodically or non-periodically whether the fast storage device needs to be changed (step 1420).

Specifically, whether the fast storage device needs to be changed may be determined periodically or non-periodically according to a WAF, the size of a free block, the occurrence of a write delay, etc.

For example, when a WAF value of the fast storage device is higher than that of another storage device, the data mirroring control apparatus 110 may determine that the fast storage device needs to be changed.

In another example, when the fast storage device has a write delay or when the size of the free block is reduced to a predetermined or, alternatively, reference size or less by the execution of a write command by the fast storage device, the data mirroring control apparatus 110 may determine that the fast storage device needs to be changed.

Then, the data mirroring control apparatus 110 may transmit a write command for data with a memory lock to a storage device that is to be set as the fast storage device (step 1440).

According to at least one example embodiment of the inventive concepts, if the storage device that is to be set as the fast storage device is an SSD, the data mirroring control apparatus 110 may transmit a trim command to the SSD based on information about the writing of the data to the current fast storage device before transmitting the write command for the data with the memory lock to the SSD that is to be set as the fast storage device (step 1430).

When the storage device that is to be set as the fast storage device completes writing the data with the memory lock (step 1450), the data mirroring control apparatus 110 may change the fast storage device to the storage device (step 1460).

Here, according to at least one example embodiment of the inventive concepts, when the SSD set as the fast storage device becomes a slow storage device, the data mirroring control apparatus 110 may transmit a garbage collection command to the SSD (step 1470).

Figure 16:
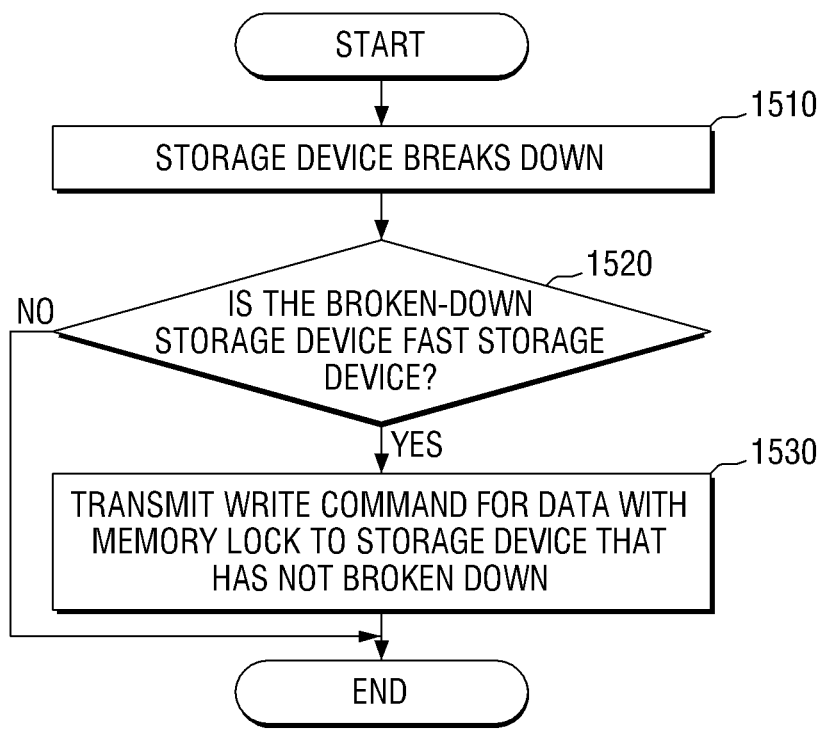
FIG. 16 is a flowchart illustrating a data recovery process in a case where a fast storage device breaks down According to at least one example embodiment of the inventive concepts at least one example embodiment of the inventive concepts.

FIG. 16 is a flowchart illustrating a data recovery process in a case where a fast storage device breaks down according to at least one example embodiment of the inventive concepts. Referring to FIG. 16, when one of a plurality of storage devices 130 breaks down (step 1510), the data mirroring control apparatus 110 may determine whether the broken-down storage device is a fast storage device (step 1520).

If the broken-down storage device is the fast storage device, the data mirroring control apparatus 110 may transmit a write command for data with a memory lock to another storage device which has not broken down (step 1530).

The memory lock on the data in the host memory indicates that the data has not yet been written to at least one of the storage devices 130.

Therefore, the data mirroring control apparatus 110 transmits the write command for the data with the memory lock to a storage device which has not received the write command for the data, thereby preventing the loss of the data due to the breakdown of the fast storage device.

The memory lock set on the data also indicates that the write command for the data has already been transmitted to the fast storage device. Therefore, if the broken-down storage device is not the fast storage device, no data recovery procedure is required.

Figure 17:
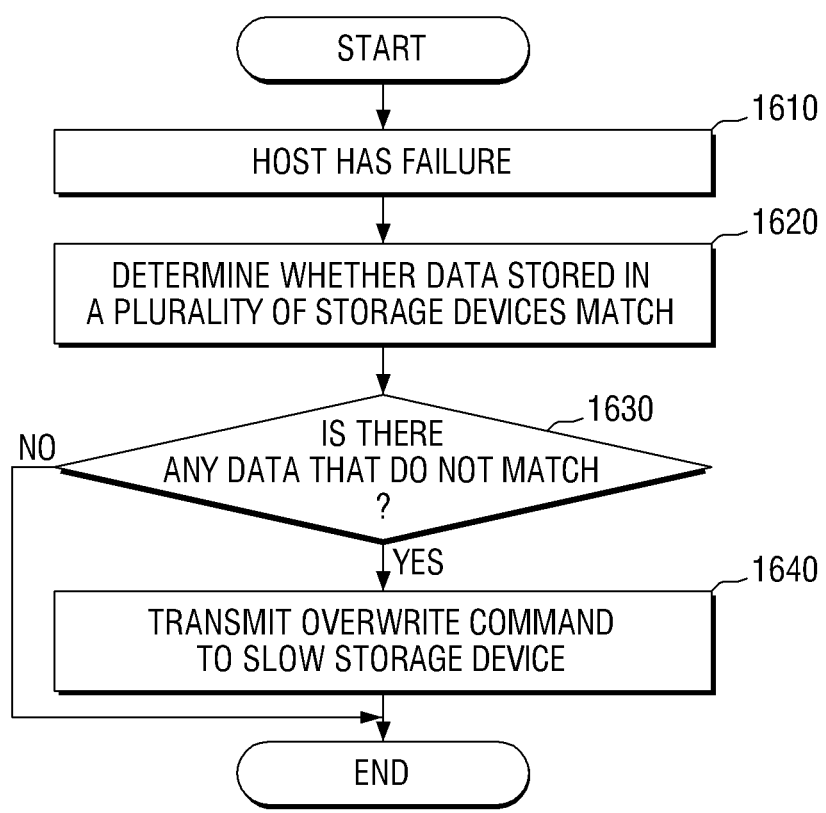
FIG. 17 is a flowchart illustrating a data recovery process in a case where a host has a failure According to at least one example embodiment of the inventive concepts at least one example embodiment of the inventive concepts.

FIG. 17 is a flowchart illustrating a data recovery process in a case where the host 120 has a failure according to at least one example embodiment of the inventive concepts.

Referring to FIG. 17, when the host 120 is rebooted due to a failure (step 1610), for example an unexpected failure, the data mirroring control apparatus 110 may determine whether data stored in a plurality of storage devices 130 match (step 1620).

Here, According to at least one example embodiment of the inventive concepts, the data mirroring control apparatus 110 may divide the whole data area of each of the storage devices 130 into a plurality of chunks and determine whether the data stored in the storage devices 130 match by using an update bit corresponding to each of the chunks.

According to another embodiment, the data mirroring control apparatus 110 may log a list of data with memory locks stored in the host memory and store the list of data in a nonvolatile memory or an area of a fast storage device. Thus, when the host 120 is rebooted, the data mirroring control apparatus 110 may determine whether the data stored in the storage devices 130 match by referring to the list.

When the data stored in the storage devices 130 do not match (step 1630), the data mirroring control apparatus 110 may transmit an overwrite command to other storage devices based on data stored in the fast storage device (step 1640).

Specifically, since the latest data is stored in the fast storage device, when data stored in a chunk of the fast storage device does not match data stored in a corresponding chunk of another storage device, the data mirroring control apparatus 110 may overwrite the data stored in the chunk of the fast storage device to the corresponding chunk of the another storage device, thereby matching the data stored in the chunk of the fast storage device with the data stored in the corresponding chunk of the another storage device.

According to at least one example embodiment of the inventive concepts, data requested by a host to be written is stored in a host memory until the data is written to all mirroring storage devices. Therefore, data loss due to the breakdown of any of the storage devices may be prevented.

In addition, when one of a plurality of mirroring storage devices completes writing data, a write complete message for the data is immediately transmitted to the host. This can improve write performance.

Further, a trim command and a garbage collection command are transmitted at appropriate times. Therefore, the performance and life of an SSD can be increased.

At least one example embodiment of the inventive concepts can also be embodied as computer-readable code on a computer-readable recording medium. The computer-readable recording medium may be any data storage device that can store data which can be thereafter read by a computer system. Examples of the computer-readable recording medium include read-only memory (ROM), random-access memory (RAM), CD-ROMs, magnetic tapes, floppy disks, and optical data storage devices. Also, functional programs, codes, and code segments for accomplishing implementing example embodiments of the inventive concepts can be easily construed by programmers skilled in the art to which example embodiments of the inventive concepts pertains.

According to at least one example embodiment, the data mirroring control apparatus 110 may include a processor that controls the operations of the data mirroring control apparatus 110. As used herein, the term 'processor' refers to a machine including circuits structurally configured to carry out specific operations, or structurally configured to execute instructions read from computer readable code. Examples of the above-referenced processor include, but are not limited to, a microprocessor, a multiprocessor, a central processing unit (CPU), a digital signal processor (DSP), an application specific integrated circuit (ASIC), and a field programmable gate array (FPGA).

According to at least one example embodiment, a processor that controls the operations of the host 120 may also be the processor that controls the data mirroring control apparatus 110. According to at least one example embodiment, a processor that controls the operations of the host 120 may be separate from the processor that controls the data mirroring control apparatus 110.

According to at least one example embodiment, any operations described herein, for example with reference to any of FIGS. 1-17, as being performed by data mirroring control apparatus 110, or one of the components therein, may be performed by the above-referenced processor included in the data mirroring control apparatus 110. For example, according to at least one example embodiment, data mirroring control apparatus 110 may be programmed, in terms of software and/or hardware, to perform any or all of the functions described herein as being performed by the data mirroring control apparatus 110.

Examples of the data mirroring control apparatus 110 being programmed, in terms of software, to perform any or all of the functions described herein as being performed by an data mirroring control apparatus 110 will now be discussed below. For example, the data mirroring control apparatus 110 may include a program memory unit may store a program including executable instructions corresponding to any or all of the operations described with reference to FIGS. 1-15 as being performed by the data mirroring control apparatus 110. According to at least one example embodiment, additionally or alternatively to being stored in the program memory unit, the executable instructions may be stored in a computer-readable medium including, for example, an optical disc, flash drive, SD card, etc., and the data mirroring control apparatus 110 may include hardware for reading data stored on the computer readable-medium. Further, the processor included in the data mirroring control apparatus 110 may be configured to perform any or all of the operations described with reference to FIGS. 1-15 as being performed by the data mirroring control apparatus 110, for example, by reading and executing the executable instructions stored in at least one of the above-referenced program memory and a computer readable storage medium loaded into hardware included in the data mirroring control apparatus 110 for reading computer-readable mediums.

Examples of the data mirroring control apparatus 110 being programmed, in terms of hardware, to perform any or all of the functions described herein as being performed by the data mirroring control apparatus 110 will now be discussed below. Additionally or alternatively to executable instructions corresponding to the functions described with reference to FIGS. 1-17 as being performed by the data mirroring control apparatus 110 being stored in a program memory unit or a computer-readable medium as is discussed above, the processor included in the data mirroring control apparatus 110 may include a circuit that has a structural design dedicated to performing any or all of the operations described with reference to FIGS. 1-17 as being performed by the data mirroring control apparatus 110. For example, the above-referenced circuit included in the processor of the data mirroring control apparatus 110 may be a FPGA or ASIC physically programmed to perform any or all of the operations described with reference to FIGS. 1-17 as being performed by the data mirroring control apparatus 110.

Example embodiments having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A data mirroring control apparatus comprising:
  a memory storing computer-readable instructions; and
  one or more processors configured to execute the instructions such that the one or more processors are configured to,
    set at least one of the plurality of mirroring storage devices as a fast storage device;
    transmit a first write command to the fast storage device, the first write command including an instruction for data requested by a host to be written;
    set a memory lock on the data requested by the host to be written among data stored in a host memory which is located in the host and release the memory lock on the data after the data with the memory lock is written to the plurality of mirroring storage devices;
    transmit the first write command for the data with the memory lock to a storage device which has not received the first write command for the data with the memory lock; and
    transmit a trim command to the storage device which has not received the first write command for the requested data based on information about the writing of the requested data to one of the plurality of mirroring storage devices.

2. A data mirroring control method comprising:
  transmitting a first write command to a plurality of mirroring storage devices, the first write command including an instruction for data requested by a host to be written;
  setting a memory lock on the data requested by the host to be written among data stored in a host memory;
  releasing the memory lock on the data after the data with the memory lock is written to the plurality of mirroring storage devices; and
  transmitting a trim command to a storage device which has not received the write command for the requested data based on information about the writing of the requested data to one of the plurality of mirroring storage devices.

3. The method of claim 2, further comprising:
  transmitting a write complete message for the requested data to the host when one of the plurality of mirroring storage devices completes writing the requested data.

4. The method of claim 2, wherein in the transmitting of the first write command, the first write command for the data with the memory lock is transmitted to a storage device which has not received the first write command for the data with the memory lock.

5. The method of claim 2, further comprising:
setting at least one of a plurality of mirroring storage devices as a fast storage device,
wherein the transmitting the first write command includes transmitting the first write command to the fast storage device.

6. The method of claim 5, wherein in the setting of the at least one mirroring storage device as the fast storage device includes setting the fast storage device based on writing completion speed in response to the first write command.

7. The method of claim 5, further comprising:
transmitting a write complete message for the requested data to the host after the requested data is written to the fast storage device.

8. The method of claim 5, wherein the fast storage device is changed periodically or non-periodically.

9. The method of claim 8, further comprising:
when the fast storage device is changed, transmitting the first write command for the data with the memory lock to a new fast storage device.

10. The method of claim 8, further comprising:
transmitting the first write command for the data with the memory lock to a first storage device, when requirements for changing the fast storage device are met, the first storage device being; and
changing the fast storage device by setting the first storage device as the fast storage device when the first storage device completes writing the data with the memory lock.

11. The method of claim 5, further comprising: when the fast storage device breaks down, transmitting the first write command for the data with the memory lock to another storage device which has not broken down.

12. The method of claim 5, further comprising:
when the host has a failure,
determining whether data stored in each of the plurality of mirroring storage devices is the same; and
transmitting a write command to one or more other storage devices based on data stored in the fast storage device if the data stored in the plurality of mirroring storage devices is not the same, the one or more other storage devices being storage devices, from among the plurality of mirroring storage device, that are not set as the fast storage device.

13. The method of claim 5, wherein,
the plurality of mirroring storage devices include at least one HDD, and
when the HDD is the at least one mirroring storage device that is set as the fast storage device, a random writing write command is converted into a sequential write command, and the sequential write command is transmitted to the HDD, the random writing write command including an instruction for data requested by the host to be written randomly, the sequential write command including an instruction for data requested by the host to be written sequentially.

* * * * *